United States Patent
Takamune et al.

(10) Patent No.: US 6,979,971 B2
(45) Date of Patent: Dec. 27, 2005

(54) CONTROL DEVICE-BUILT-IN CYLINDER SERVO MOTOR

(75) Inventors: Kouichi Takamune, Tokyo (JP); Hidenobu Itou, Tokyo (JP); Takao Mizutani, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 14 days.

(21) Appl. No.: 10/297,434

(22) PCT Filed: Apr. 26, 2001

(86) PCT No.: PCT/JP01/03636

§ 371 (c)(1),
(2), (4) Date: May 19, 2003

(87) PCT Pub. No.: WO02/091096

PCT Pub. Date: Nov. 14, 2002

(65) Prior Publication Data

US 2003/0184252 A1 Oct. 2, 2003

(51) Int. Cl.[7] .......................................... G05D 23/275
(52) U.S. Cl. ................. 318/632; 318/560; 318/568.22; 318/634; 700/193
(58) Field of Search ....................... 318/568.22, 560, 318/634, 632; 700/193

(56) References Cited

U.S. PATENT DOCUMENTS

| 5,237,509 A | * | 8/1993 | Ueta et al. ................... 700/193 |
| 5,525,885 A | * | 6/1996 | Sato ............................. 318/632 |
| 6,320,344 B1 | * | 11/2001 | Sakamoto et al. ........... 318/567 |

FOREIGN PATENT DOCUMENTS

| JP | 59-081705 A | 5/1984 |
| JP | 61-168005 A | 7/1986 |
| JP | 62-150405 A | 7/1987 |
| JP | 63-006604 A | 1/1988 |
| JP | 08-039399 A | 2/1996 |
| WO | WO 01/63730 A1 | 2/2000 |

* cited by examiner

Primary Examiner—Rita Leykin
(74) Attorney, Agent, or Firm—Sughrue Mion, PLLC

(57) ABSTRACT

An operation command for constructing compensation data is generated in a control device, and measurement data obtained from an external length measuring device is input to an input unit. The measurement data is compared with an estimated position in a control device of a cylinder servo motor, and errors between them is stored in a compensation memory. In addition, in normal operation, the external length measuring device is removed. A movement command is input to the input unit and compensated using the error stored in the compensation memory, so that the estimated error is deleted in the normal operation.

7 Claims, 25 Drawing Sheets

FIG. 8
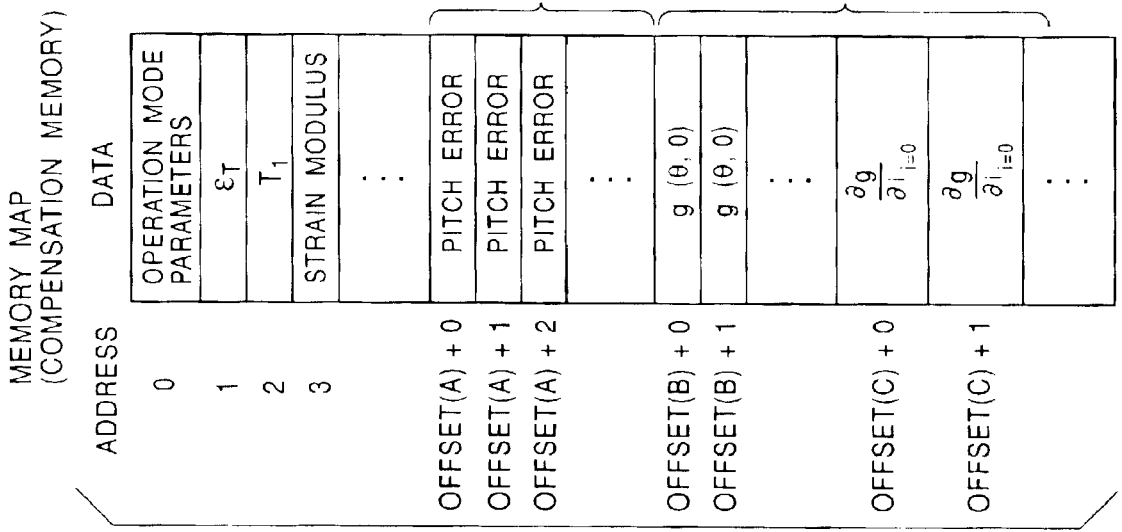
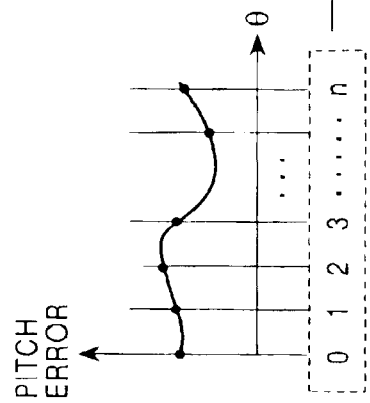

CONTROL DEVICE-BUILT-IN CYLINDER SERVO MOTOR

TECHNICAL FIELD

The present invention relates to a cylinder servo motor with a built-in control device (which will be referred to as a cylinder servo motor hereinafter), in which a servo motor unit, a control unit which controls the servo motor unit, a detector which detects a rotation angle of the servo motor unit, and a rotational/linear motion converting mechanism which converts rotational motion of the servo motor unit to linear motion are combined.

BACKGROUND ART

An example of a conventional cylinder servo motor is shown in FIG. 24.

The cylinder servo motor shown in FIG. 24 has been proposed by the inventors of the present invention and so forth, and already filed as a PCT application (Application No. PCT/JP00/01117).

With reference to the figure, reference numeral 1 denotes a servo motor unit which is constructed of a rotor 2 and a stator 3; 4, a ball nut which is connected to the rotor 2 at the side at which a load is applied; and 5, a ball screw which is screwed into the ball nut 4 and which serves as an output shaft that moves in the axial direction thereof. A rotational/linear motion converting mechanism is formed by the ball nut 4 and the ball screw 5. In addition, reference numeral 7 denotes a rotation detector which detects an amount of rotation of the rotor 2 and which includes a sensor unit 7a and a signal processing unit 7b. The signal processing unit 7b includes a rotation detector controlling unit 8, a compensation memory 9, and an adder/subtractor circuit 10. In addition, 6 denotes a control unit for the servo motor unit 1; 11, a length measuring device which measures a displacement of a reflection mirror 11a attached to an end portion of the ball screw 5; 19, an external command device; 12, a control device which serves as a testing device and which includes a first input unit 13, a second input unit 14, a subtractor 15, a control unit 16, a memory 17, and a memory rewriter 18; 100, a first input/output unit which is necessary for transmitting data between the external command device 16 and the control unit 6; and 101, a second input/output unit which is necessary for transmitting data between the control device 12 and the compensation memory 9.

In the cylinder servo motor, when a command is issued from the external command device 19 to the control unit 6 via the first input/output unit 100, the control unit 6 starts to rotate the rotor 2 of the servo motor unit 1.

The rotational motion of the rotor 2 is converted to linear motion by the ball nut 4 and the ball screw 5, so that the ball screw 5 starts to reciprocate.

Before the cylinder servo motor is used (before it is shipped from a factory), compensation data for compensating a positioning error (which relies upon accuracy of the components of the cylinder servo motor, accuracy of the rotation detector, etc.), is obtained, and the obtained data of the positioning error is stored in the compensation memory 9.

More specifically, the reflection mirror 11a is attached to an end portion of the ball screw 5, and the length measuring device 11 is disposed such that the length measuring device 11 opposes the reflection mirror 11a. In addition, the control device 12, which serves as a testing device, is prepared.

Then, the external command device 19 issues a command such that the operation of the cylinder servo motor starts and the ball screw 5 starts to reciprocate. A displacement of the ball screw 5 is measured by the length measuring device 11 using the reflection mirror 11a, and the measurement data is input to the control unit 16 of the control device 12 via the second input unit 14. In addition, angle data obtained by the sensor unit 7a is output to the control unit 6 and to the control unit 16 via the second input/output unit 101 and the first input unit 13. The control unit 16 calculates an estimated position of the end portion of the ball screw 5 by multiplying the detection data obtained from the rotation detector 7 by a ball screw lead. Then, the estimated position of the end portion of the ball screw 5 calculated by the control unit 16 and the measurement data obtained by the length measuring device 11 are transmitted to the subtractor 15. The subtractor 15 calculates the positioning error between the estimated position of the end portion of the ball screw 5 and the position measured by the length measuring device 11. The error calculated by the subtractor 15 is stored in the memory 17 via the control unit 16. Then, after the above-described error measurement is completed, the memory rewriter 18 records the error data stored in the memory 17 in the compensation memory 9 via the second input/output unit 101. Accordingly, before this cylinder servo motor is used (before it is shipped from a factory), compensation data with which the positioning error is compensated for is stored in the compensation memory 9.

In normal operation, the reflection mirror 11a, the length measuring device 11, and the control device 12 are removed. In order that the end portion of the ball screw 5 is accurately positioned, detection data of the rotation detector 7 is compensated using the compensation data stored in the compensation memory 9, and the compensated value is output to the control unit 6. The control unit 6 servo-controls the servo motor unit 1 based on the compensated value.

As described above, according to the known cylinder servo motor, positioning accuracy of the ball screw 5 is measured in advance using the length measuring device 11, and the detection data of the rotation detector 7 is compensated so that accurate positioning can be realized. However, in order to obtain the compensation data, the control device 12 for calculating the compensation data and recording it in the compensation memory 9 is required in addition to the length measuring device 11. Accordingly, every time the cylinder servo motor is disassembled for maintenance and/or repair, the control device 12, which is a testing device, must be reset and the compensation data must be re-calculated.

In addition, in the conventional cylinder servo motor, as well as the first input/output unit 100 for transmitting data between the external command device 16 and the cylinder servo motor, the second input/output unit 101 for transmitting data between the control device 12 and the cylinder servo motor is also necessary.

Besides, in the known cylinder servo motor, reduction of positioning accuracy due to temperature variation, backlash, strain caused by stress, etc., are not taken into account. Thus, when the cylinder servo motor is operated, there is a possibility that errors due to temperature variation, backlash, strain, etc., will occur and positional accuracy will be degraded.

In order to compensate for the errors due to temperature variation, backlash, strain, etc., a thermistor, a speed sensor, a force sensor, etc., may be installed. However, in such a case, electric wires, etc., are also necessary in addition to the sensors, so that costs and the number of processes are increased and the maintainability is degraded. In addition, when the detection data obtained by the above-described sensors are processed by the external command device 19, there may be a problem in that a calculation load on the external command device 19 becomes too high.

DISCLOSURE OF INVENTION

In order to solve the above-described problems, an object of the present invention is to provide a cylinder servo motor in which positioning error compensation data, etc., can be easily constructed.

Another object of the present invention is to provide a cylinder servo motor in which the number of input/output units used for transmitting data to/from external devices such as an external command device, a length measuring device, etc., can be reduced.

Yet another object of the present invention is to provide a cylinder servo motor in which the reduction in positioning accuracy due to temperature variation, backlash, strain, etc., can be prevented.

A further object of the present invention is to provide a cylinder servo motor in which positioning error compensation data can be easily corrected.

In order to achieve the above-described objects, according to the present invention, a cylinder servo motor with a built-in control device comprises a servo motor unit having a rotor; a rotational/linear motion converting mechanism which is disposed on a rotating shaft of the servo motor unit and which converts rotational motion of the rotating shaft to linear motion; a current detector which detects a current applied to the servo motor unit; a rotation detector which detects a rotation angle of the servo motor unit; and a control unit which controls the servo motor unit. The servo motor unit and the control unit are mechanically combined, and the control unit includes a command memory which stores commands used in positional error measurement of the servo motor unit; inputting means which inputs a measurement result obtained from a length measuring device, which measures a position of an output shaft of the rotational/linear motion converting mechanism which is operated based on the commands stored in the command memory, and commands from an external command device; operation mode switching means which switches an operation mode of the cylinder servo motor with the built-in control device between a normal operation mode and a test operation mode; positioning error compensation data calculating means which, when the test operation mode is selected by the operation mode switching means, calculates an estimated position of the output shaft of the rotational/linear motion converting mechanism based on the detection angle detected by the rotation detector, and then calculates positioning error compensation data based on the estimated position of the output shaft and the measurement result of the length measuring device which is input through the inputting means; a compensation memory which stores the positioning error compensation data calculated by the positioning error compensation data calculating means; and compensating means which, when the normal operation mode is selected by the operation mode switching means, compensates for a positioning error based on the positioning error compensation data stored in the compensation memory for controlling the servo motor unit.

In addition, according to the present invention, the control unit may further include backlash compensation data calculating means which, when the normal operation mode is selected by the operation mode switching means, calculates backlash compensation data based on data stored in the compensation memory, the detection data obtained from the rotation detector, and detection data obtained from the current detector; and compensating means which compensates for a backlash error based on the backlash compensation data for controlling the servo motor unit.

Besides, according to the present invention, the control unit may further include data constructing means which, when the test operation mode is selected by the operation mode switching means, constructs data used for calculating the backlash compensation data and stores the constructed data in the compensation memory.

In addition, according to the present invention, the cylinder servo motor may further comprise a temperature detector which detects the temperature of the rotational/linear motion converting mechanism, and the control unit may further include temperature error compensation data calculating means which, when the normal operation mode is selected by the operation mode switching means, calculates temperature error compensation data based on data stored in the compensation memory and detection data obtained from the temperature detector; and compensating means which compensates for a temperature error based on the temperature error compensation data for controlling the servo motor unit.

According to the present invention, the control unit may further include data constructing means which, when the test operation mode is selected by the operation mode switching means, constructs data used for calculating the temperature error compensation data and stores the constructed data in the compensation memory.

According to the present invention, the control unit may further include strain calculating means which, when the normal operation mode is selected by the operation mode switching means, calculates a thrust applied to the output shaft of the rotational/linear motion converting mechanism based on detection data obtained from the current detector, and then calculates strain data of the output shaft of the rotational/linear motion converting mechanism based on the thrust; and compensating means which compensates for a strain based on the strain data for controlling the servo motor unit.

Further, according to the present invention, a cylinder servo motor with a built-in control device comprises a servo motor unit having a rotor; a rotational/linear motion converting mechanism which is disposed on a rotating shaft of the servo motor unit and which converts rotational motion of the rotating shaft to linear motion; a rotation detector which detects a rotation angle of the servo motor unit; and a control unit which controls the servo motor unit. The servo motor unit and the control unit are mechanically combined, and the control unit includes a memory which stores a plurality of positioning error compensation data values in association with detection angles detected by the rotation detector; and calculating means which calculates estimated stroke end positions of the output shaft of the rotational/linear motion converting mechanism at a time when the output shaft is moved to stroke ends thereof in a state such that the cylinder servo motor with the built-in control device is installed in a mechanical apparatus, and which compares the estimated stroke end positions with stroke end positions that are individual to the mechanical apparatus, and, when there are differences between the two values, calculates data for obtaining, from the plurality of positioning error compensation data values, a specific positioning error compensation data value which is able to compensate for a positioning error based on the differences, or data for correcting the plurality of positioning error compensation data values itself stored in the memory in advance, based on the differences in a process of compensating for the positioning error.

BRIEF DESCRIPTION OF THE DRAWINGS

FIG. 8 is a diagram showing a memory map according to the first embodiment of the present invention;

BEST MODE FOR CARRYING OUT THE INVENTION

First Embodiment

A first embodiment of the present invention will be described below with reference to FIGS. 1 to 14.

Figure 1:
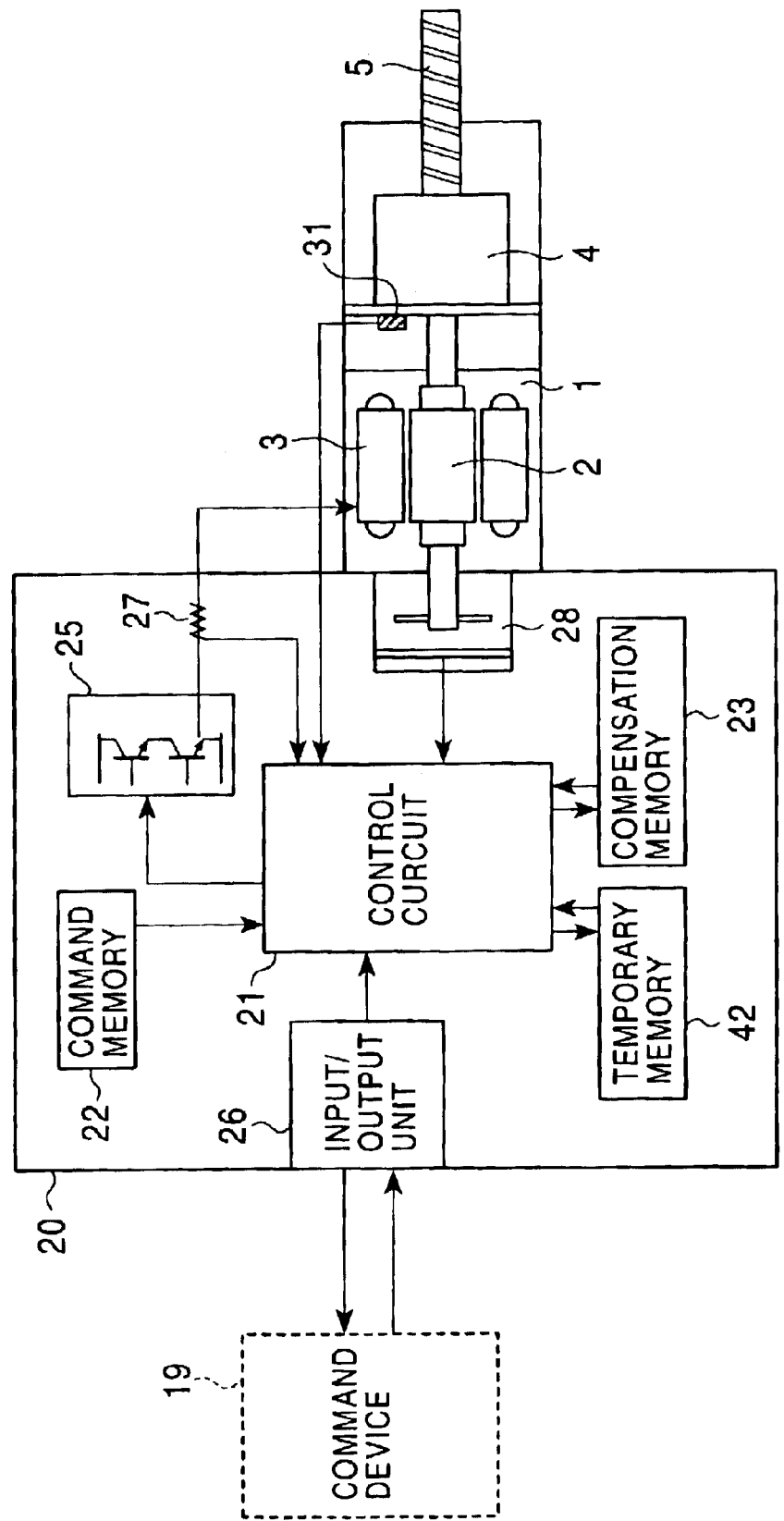
FIG. 1 is a structure diagram of a cylinder servo motor according to a first embodiment of the present invention in a normal operation.

FIG. 1 is a structure diagram of a cylinder servo motor according to the first embodiment. This figure shows the structure of the cylinder servo motor in a normal operation mode.

With reference to the figure, reference numeral 1 denotes a servo motor unit, which is constructed of a rotor 2 and a stator 3; 4, a ball nut which is connected to the rotor 2 at the side at which a load is applied; 5, a ball screw which is screwed into the ball nut 4 and which serves as an output shaft that moves in the axial direction thereof. A rotational/linear motion converting mechanism is formed by the ball nut 4 and the ball screw 5. In addition, reference numeral 20 denotes a control unit; 21, a control circuit which is constructed of a built-in microcomputer, etc., and which servo controls the servo motor unit 1; 22, a command memory which is used in a test operation mode, which will be described below; 23, a compensation memory which stores various data including a plurality of parameters, pitch error compensation data, backlash compensation data, and temperature compensation data, for improving positioning accuracy of the cylinder servo motor. In addition, 42 denotes a temporary memory used in a test operation mode, which will be described below; 25, an inverter circuit which drives the servo motor unit 1; 26, an input/output unit 26 which is used for transmitting data to/from an external command device 19 and a length measuring device 11; 27, a current detector which detects a current applied to the servo motor unit 1 and outputs detection data to the control circuit 21; 28, a rotation detector which detects the rotation of the servo motor unit 1 and outputs the detection data to the control circuit 21; and 31, a temperature detector which detects the temperature of the ball screw 5 and the ball nut 4 and outputs the detection data to the control circuit 21.

Figure 3:
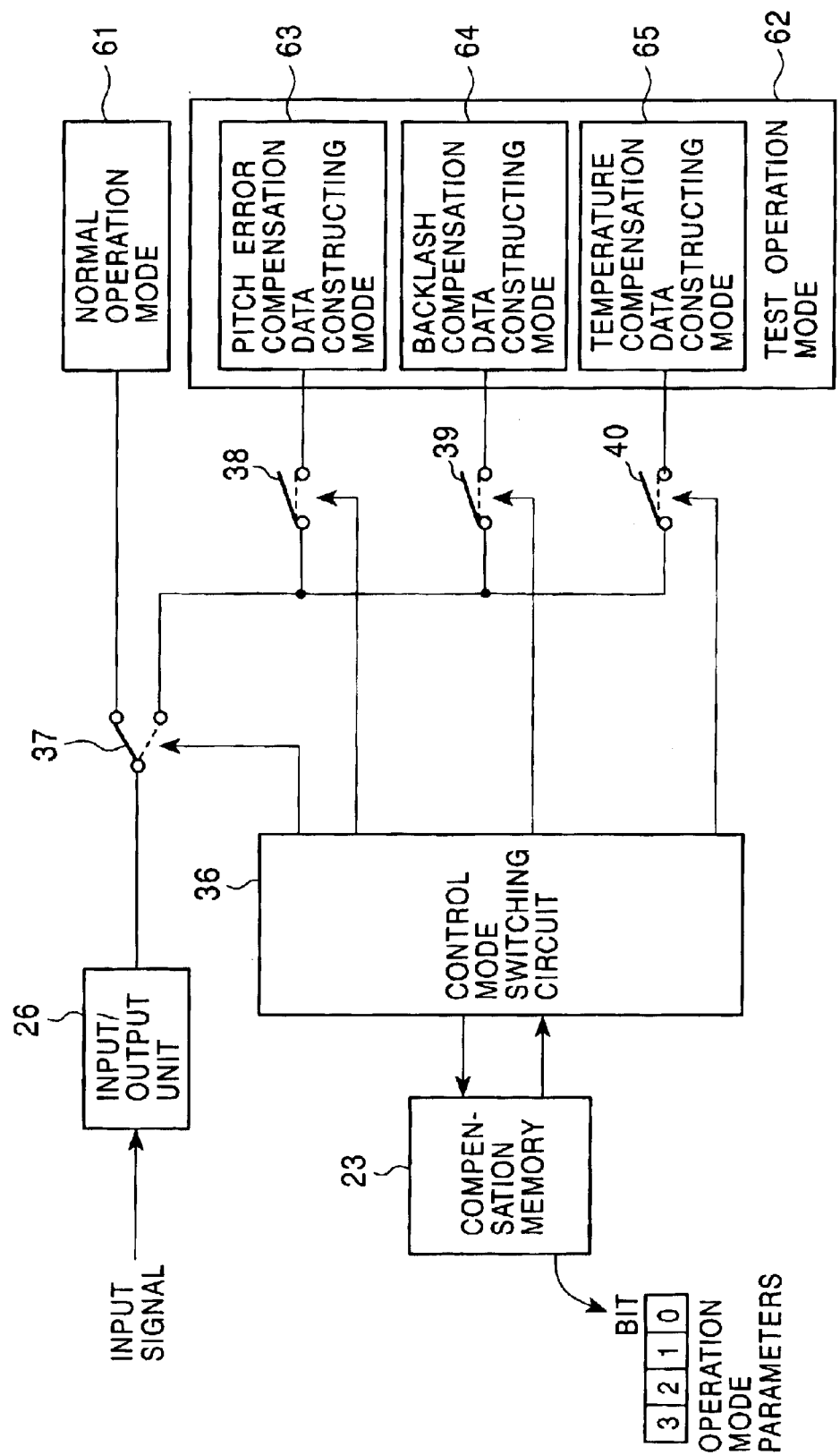
FIG. 3 is a block diagram showing an operation of choosing an operation mode according to the first embodiment of the present invention.

The cylinder servo motor is operated based on two operation modes: a normal operation mode and a test operation mode. FIG. 3 is a block diagram showing a process of selecting the operation mode. The above-described two operation modes are a test operation mode 62, which is for calculating compensation data, and a normal operation mode 61. The test operation mode 62 includes a pitch error compensation data constructing mode 63, a backlash compensation data constructing mode 64, and a temperature compensation data constructing mode 65. A control mode switching circuit 36 operates switches 37 to 40 based on operation mode parameters stored in the compensation memory 23, and selects one among the normal operation mode 61, the pitch error compensation data constructing mode 63, the backlash compensation data constructing mode 64, and the temperature compensation data constructing mode 65. The operation mode parameters are updated by the external command device 19 in the normal operation mode, and the test operation mode is implemented in accordance with the operation mode parameters the next time the power is turned on. The circuits shown in FIG. 3, other than the input/output unit 26 and the compensation memory 23, are constructed of software programs installed in the control circuit 21.

The above-described operation mode parameters are constructed of four bits which are individually assigned to a continuous test operation mode (in which three modes of the pitch error compensation data constructing mode 63, the backlash compensation data constructing mode 64, and temperature compensation data constructing mode 65 are implemented in sequence) and the three individual test operation modes. When the test operation mode is to be implemented, the control circuit 21 changes the corresponding parameter from 0 to 1 based on a command issued by the external command device 19 in the normal operation mode, and then turns the power off. Then, when the power is turned on again, the control mode switching circuit 36 refers to the four parameters, selects the test operation mode corresponding to the bit that is set to 1, and then clears the bit to 0. In the case in which all of the parameters are 0 when the power is turned on, the normal operation mode is selected.

Figure 4:
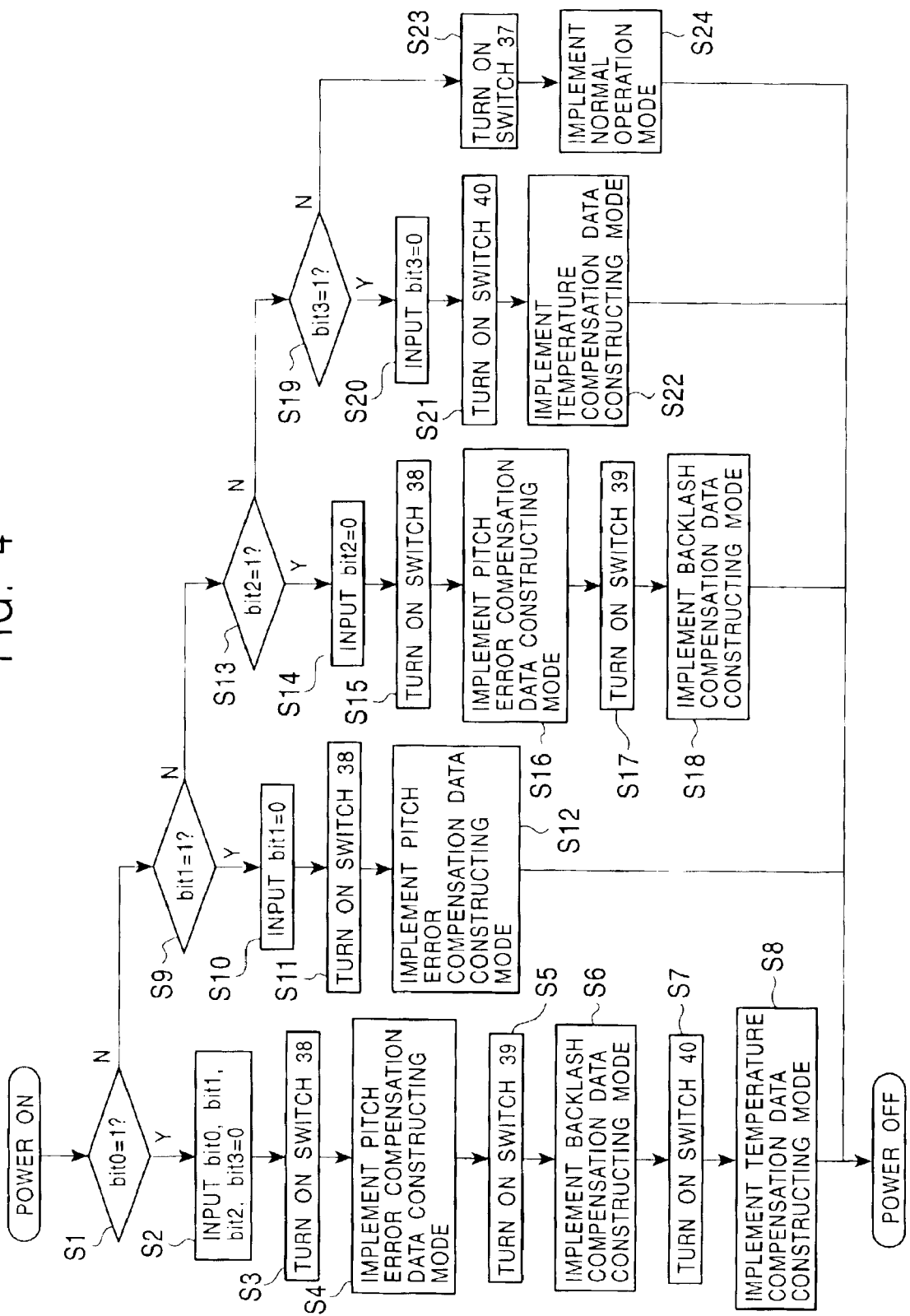
FIG. 4 is a flowchart showing the operation of choosing an operation mode according to the first embodiment of the present invention.

FIG. 4 is a flowchart showing the above-described process. With reference to FIG. 4, the continuous test operation mode is implemented when bit0 is 1, the pitch error compensation data constructing mode 63 is implemented when bit1 is 1, the backlash compensation data constructing mode 64 is implemented when bit2 is 1, and the temperature compensation data constructing mode 65 is implemented when bit3 is 1. When the backlash compensation data constructing mode 64 is to be implemented, it is necessary that the pitch error compensation data constructing mode 63 be implemented in advance. Thus, when bit2 is 1, the pitch error compensation data constructing mode 63 and the backlash compensation data constructing mode 64 are implemented in sequence.

After the power is turned on, the control mode switching circuit 36 refers to the operation mode parameters and determines whether or not bit0 is set to 1 (S1). When bit0 is set to 1, all the bits are cleared to 0 (S2), and the switches 38 to 40 are operated in sequence so that the pitch error compensation data constructing mode 63, the backlash compensation data constructing mode 64, and the temperature compensation data constructing mode 65 are implemented. More specifically, first, the switch 38 is turned on at S3 and the pitch error compensation data constructing mode 63 is implemented (S4). Then, the switch 39 is turned on at S5 and the backlash compensation data constructing mode 64 is implemented (S6). Lastly, the switch 40 is turned on at S7 and the temperature compensation data constructing mode 65 is implemented (S8).

Since all of the parameters are cleared to 0 at S1, the normal operation mode 61 is implemented the next time the power is turned on.

In the case in which bit0 is set to 0 when the power is turned on, whether or not bit1 is set to 1 is determined (S9). When bit1 is set to 1, the control mode switching circuit 36 clears bit1 to 0 (S10), turns on the switch 38 (S11), and implements the pitch error compensation data constructing mode (S12). In the case in which bit2 or bit3 is set to 1 at this time, the backlash compensation data constructing mode 64 or the temperature compensation data constructing mode 65 is implemented the next time the power is turned on. In addition, in the case in which both bit2 and bit3 are 0, the normal operation mode 61 is implemented the next time the power is turned on.

In the case in which bit0 and bit1 are both 0 when the power is turned on, whether or not bit2 is set to 1 is determined (S13). When bit2 is set to 1, the control mode switching circuit 36 clears bit2 to 0 (S14). Then, the control mode switching circuit 36 turns on the switch 38 (S15) and implements the pitch error compensation data constructing mode (S16), and then turns on the switch 39 (S17) and implements the backlash compensation data constructing mode 64 (S18). In the case in which bit3 is set to 1 at this time, the temperature compensation data constructing mode 65 is selected the next time the power is turned on. In addition, in the case in which bit3 is 0 at this time, the normal operation mode 61 is implemented the next time the power is turned on.

In the case in which bit0, bit1, and bit2 are all set to 0, whether or not bit3 is set to 1 is determined (S19). When bit3 is set to 1, the control mode switching circuit 36 clears bit2 to 0 (S20), turns on the switch 40 (S21), and implements the temperature compensation data constructing mode 65 (S22).

Since bit0, bit1, bit2, and bit3 are all set to 0 at this time, the normal operation mode 61 is implemented the next time the power is turned on.

In the case in which bit0, bit1, bit2, and bit3 are all set to 0, the control mode switching circuit 36 turns on the switch 37 (S23) and implements the normal operation mode 61 (S24).

Figure 2:
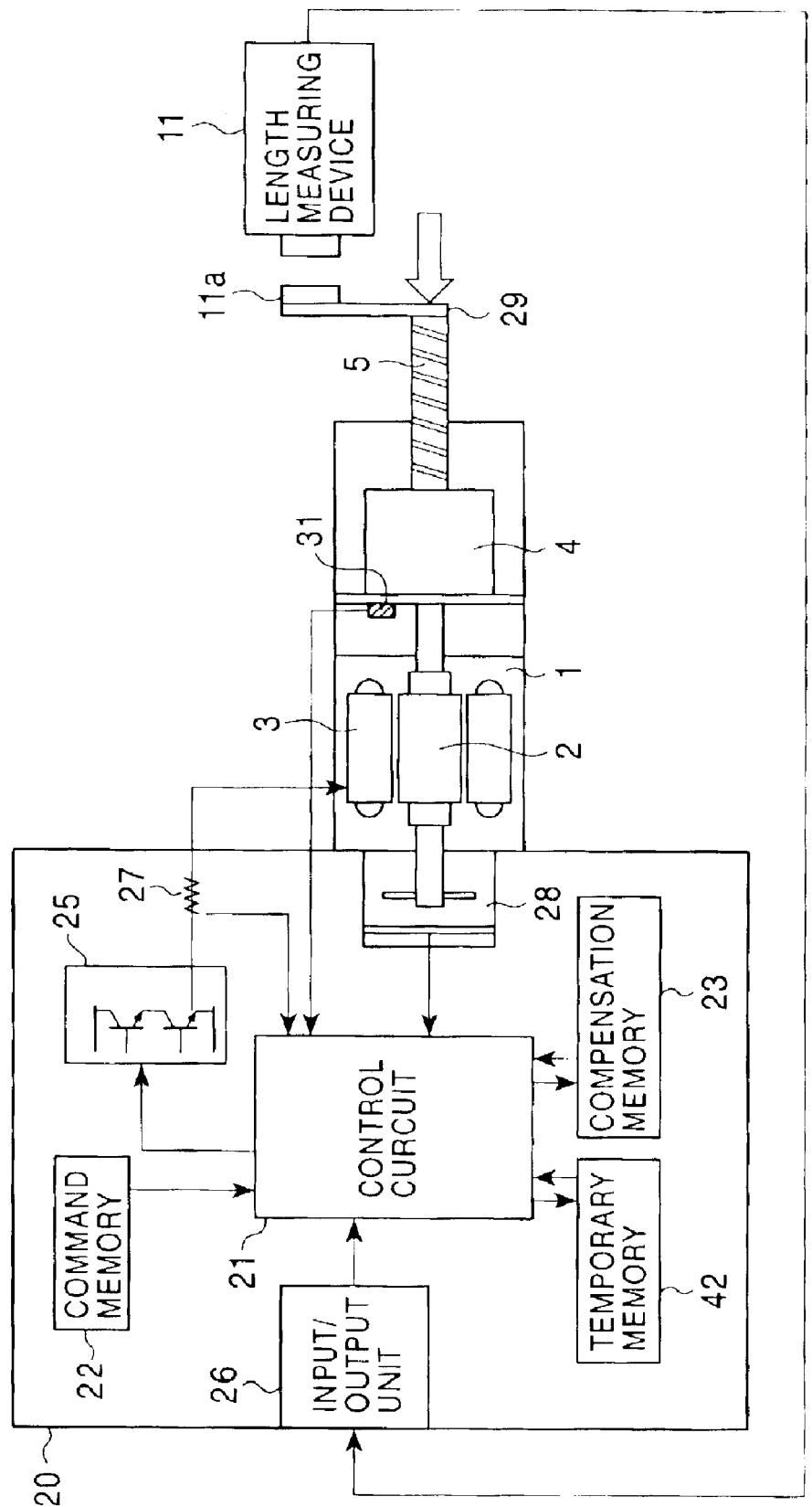
FIG. 2 is a structure diagram of the cylinder servo motor according to the first embodiment of the present invention in a test operation.

Next, the test operation mode will be described below in detail. FIG. 2 is a structure diagram of the cylinder servo motor in the test operation mode.

A reflection mirror 11a is fixed to an end portion of the ball screw 5. In addition, a length measuring device 11 is disposed such that the length measuring device 11 opposes the reflection mirror 11a, and an output unit of the length measuring device 11 is connected to the input/output unit 26. The length measuring device 11 measures the position of the reflection mirror 11a, that is, the position of the end portion of the ball screw 5, and the measurement result is sent to the control circuit 21 via the input/output unit 26 in the control unit 20. In addition, an operation pattern stored in the command memory 22 is transmitted to the control circuit 21 as a command, and the amount of rotation of the servo motor unit 1 detected by the rotation detector 28 is also transmitted to the control circuit 21. The inverter circuit 25 is feedback-controlled so that the servo motor unit 1 is operated.

In the cylinder servo motor, it is not necessary to input a movement command from a host controller. Thus, the input/output unit 26 requires only one connector for receiving the measurement data from the length measuring device 11.

In the pitch error compensation data constructing mode 63, a table of pitch error, which relies upon accuracy of the components of the cylinder servo motor (such as the rotational/linear motion converting mechanism, etc.), accuracy of detectors, etc., is constructed. The table will be referred to as a positioning error table in the following descriptions. With reference to FIG. 2, the control circuit 21 calculates the difference between the position of the reflection mirror 11a, that is, the position of the end portion of the ball screw 5 measured by the length measuring device 11, and an estimated position of the end portion of the ball screw 5 obtained by multiplying the amount of rotation of the servo motor unit 1 by a lead length of the ball screw 5. The calculated difference is recorded in the positioning error table, which is stored in the compensation memory 23.

Figure 5:
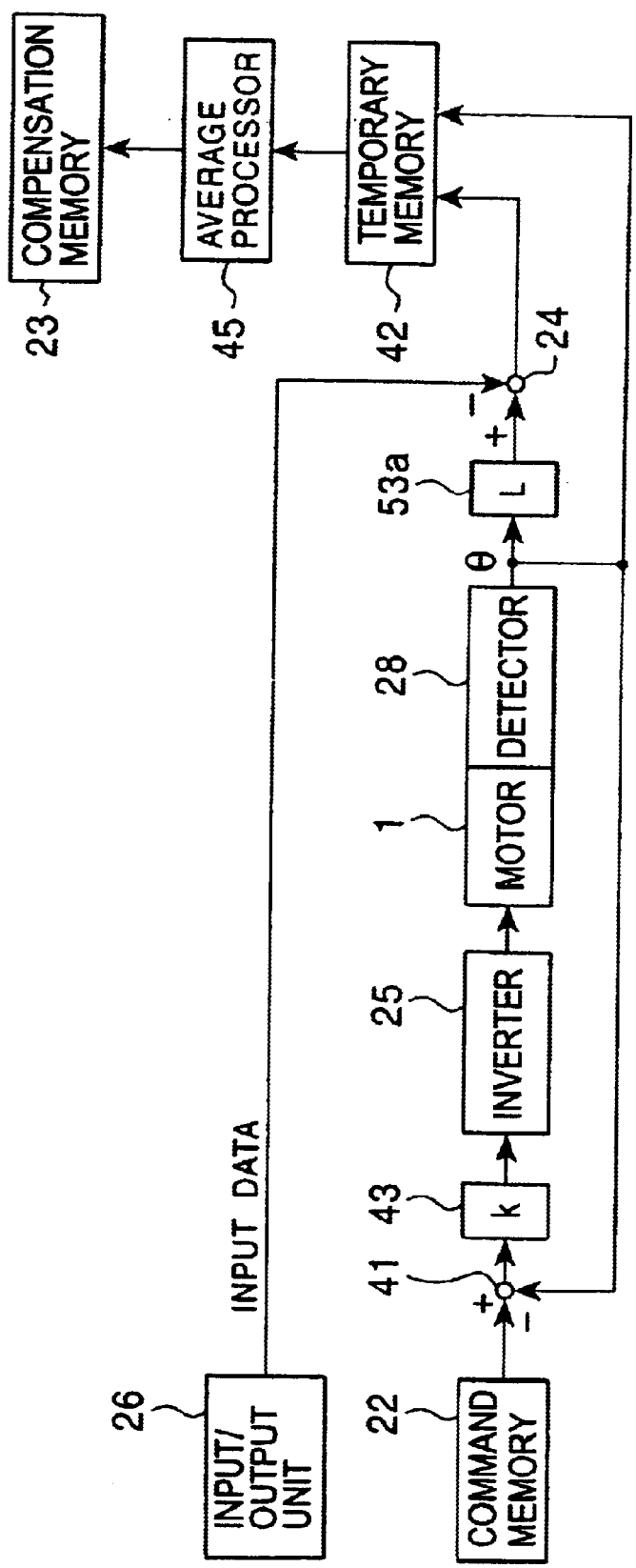
FIG. 5 is a control block diagram showing an operation of constructing positioning error compensation data according to the first embodiment of the present invention.

The above-described operation will be explained below with reference to a control block diagram shown in FIG. 5. In the figure, the same circuits as those shown in FIGS. 1 and 2 are denoted by the same reference numerals. In addition, a subtractor 41, a ball screw lead multiplier 53a, and an average processor 45 are constructed of software programs installed in the control circuit 21 shown in FIGS. 1 and 2.

A movement command is generated based on the operation pattern stored in the command memory 22, and the inverter circuit 25 is driven in a feedback control system constructed of the subtractor 41 and a controller 43, so that the servo motor unit 1 is operated. The operation pattern stored in the command memory 22 is reciprocation. The error data is obtained while the ball screw 5 is moved once forward and once backward, and the average thereof is calculated and stored in the compensation memory 23.

The ball screw lead multiplier 53a calculates the estimated position of the end portion of the ball screw 5 by multiplying a detection angle θ (amount of rotation of the motor) obtained from the rotation detector 28 by a ball screw lead L. A subtractor 24 calculates the difference between the estimated position calculated by the ball screw lead multiplier 53a and the position of the end portion of the ball screw 5 measured by the length measuring device 11. The calculated result is stored in the temporary memory 42 along with θ, which is detected by the rotation detector 28, as a provisional positioning error.

Then, when the servo motor unit 1 is rotated in the reverse direction, the ball screw lead multiplier 53a also calculates the estimated position of the end portion of the ball screw 5 by multiplying the detection angle θ obtained from the rotation detector 28 by the ball screw lead L. In addition, the subtractor 24 calculates the difference between the estimated position calculated by the ball screw lead multiplier 53a and the position of the end portion of the ball screw 5 measured by the length measuring device 11. Then, the average processor 45 reads the provisional positioning error, which has been stored in the temporary memory 42 in the forward rotation, and takes the average between the provisional positioning error and the error which occurred in the reverse rotation. Then, the calculated average is recorded in the positioning error table, which is stored in the compensation memory 23 along with θ.

Besides, for backlash compensation, which will be described below, the difference between the positioning error which occurred in the forward rotation and the positioning error which occurred in the reverse rotation is stored in the temporary memory 42 as provisional backlash data.

Figure 6:
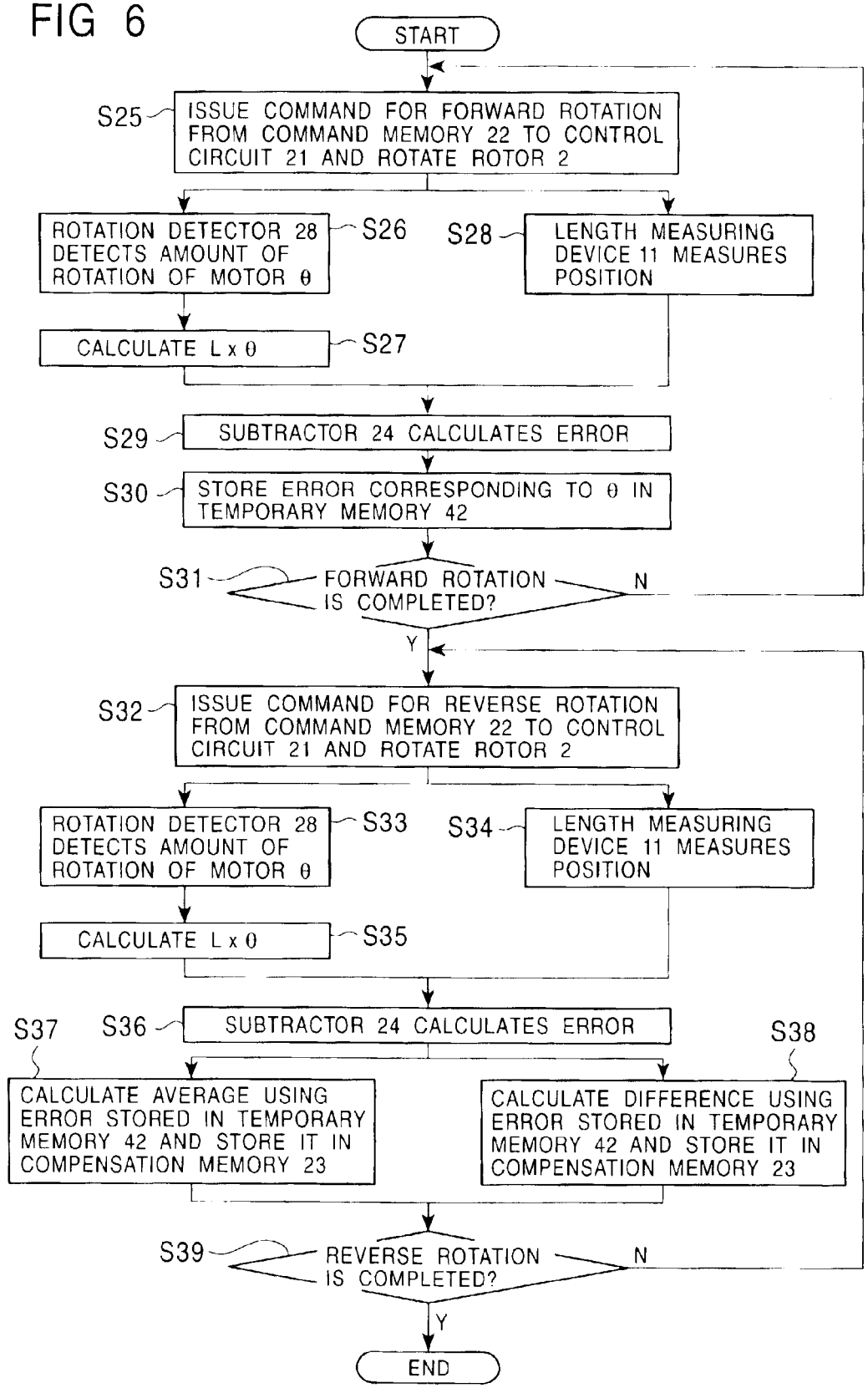
FIG. 6 is a flowchart showing the operation of constructing the positioning error compensation data according to the first embodiment of the present invention.

FIG. 6 is a flowchart showing the above-described process.

First, a command for forward rotation is issued from the command memory 22 to the control circuit 21, and the rotor 2 of the servo motor unit 1 is rotated forward using the inverter circuit 25 (S25). When the servo motor unit 1 starts to rotate, the rotation detector 28 detects the detection angle θ (amount of rotation of the motor) in accordance with the rotation of the servo motor unit 1 (S26). Then, the ball screw lead multiplier 53a calculates the estimated position of the end portion of the ball screw 5 by multiplying the detection angle θ by the lead length L of the ball screw 5 (S27). The ball screw 5 moves in the axial direction as the servo motor unit 1 rotates forward, and the length measuring device 11 measures the position of the end portion of the ball screw 5 (S28). Then, the subtractor 24 calculates the error between the estimated position obtained at S27 and the position of the end portion of the ball screw 5 measured by the length measuring device 11 (S29). The obtained error data is stored in the temporary memory 42 at an address corresponding to θ (S30). More specifically, in order that the error data can be obtained in association with θ, the error data is stored at the address expressed by the following equation. In addition, storage in the compensation memory 23 is performed in a similar manner.

$$\text{Address corresponding to } \theta = \text{floor}\left(\frac{\theta}{N}\right) + \text{Offset} \quad (1)$$

In the above-described equation, floor is a function which truncates any digits after the decimal point, N is the number of partitions, and Offset is for designating a start address.

FIG. 8 shows an example of a manner in which the error data is stored. In FIG. 8, a plot graph at the left side shows the relationship between θ and the error data. The numbers placed below the horizontal axis correspond to the first term in the above-described equation, and each error data is stored at the corresponding address shown in an address map at the right side in FIG. 8. In the present embodiment, an offset (A) shows the start address for storing the positioning error data. Data other than the positioning error data that must also be obtained in association with θ are stored at addresses with different start addresses (offsets). For example, backlash compensation factors g(θ,0) and $$\frac{\partial g}{\partial i_{i=0}},$$

which will be described below, must also be obtained in association with θ. Accordingly, as shown in FIG. 8, the backlash compensation factors g(θ,0) and $$\frac{\partial g}{\partial i_{i=0}}$$

are stored in the memory map using offsets (B) and (C).

The steps of calculating the error data and storing it in the temporary memory 42 are repeated until the forward rotation is completed. When it is determined that the forward rotation is completed (S31), a command for reverse rotation is transmitted from the command memory 22 to the control circuit 21, and steps similar to S25 to S28 are implemented (S32 to S35). The ball screw lead multiplier 53a calculates the estimated position of the end portion of the ball screw 5 by multiplying the detection angle θ (amount of rotation of the motor) by the lead length L of the ball screw 5, and the subtractor 24 calculates the error between the estimated position and the position of the end portion of the ball screw 5 measured by the length measuring device 11 (S36). Then, the average between the error data obtained at S36 and the error data stored in the temporary memory 42 at S30 is calculated and is stored in the compensation memory 23 at the address corresponding to θ (S37). By taking the average, the error due to backlash can be eliminated from the error data corresponding to the forward and reverse rotation. The difference between the error data stored in the temporary memory 42 at S30 and the error data calculated at S32 to S36 is stored in the temporary memory 42 at the address corresponding to θ as provisional backlash data (S38). This data represents the amount of backlash in the case in which no load is applied, and is stored in the temporary memory 42 in order to use it in the backlash compensation data constructing mode 64, which will be described below.

Then, the pitch error compensation data constructing mode 63 ends when the reverse rotation is completed (S39).

Since the data stored in the temporary memory 42 at S30 is not used in the following processes, memory area corresponding to this data may be cleared.

Figure 7:
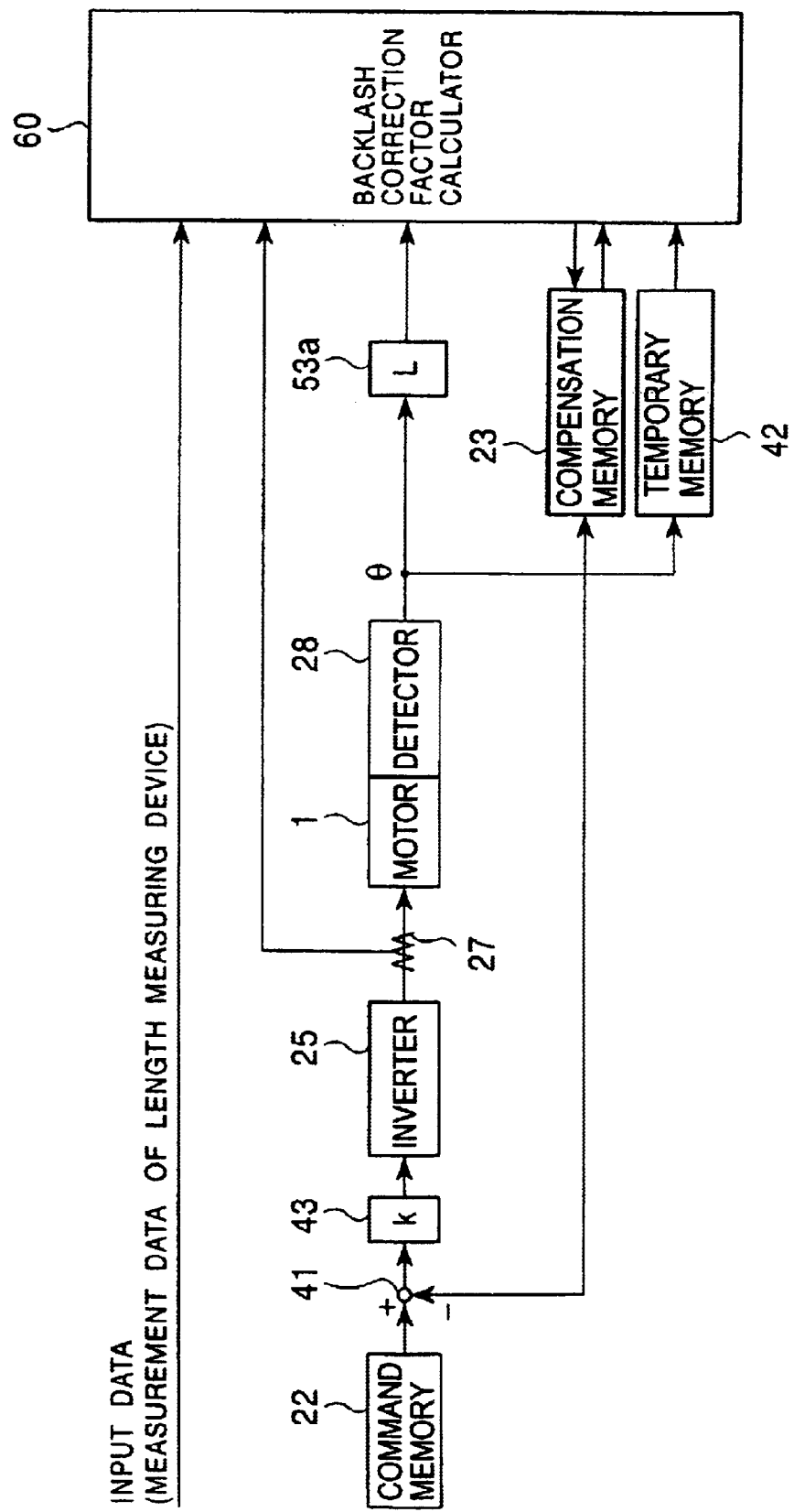
FIG. 7 is a control block diagram showing an operation of constructing backlash compensation data according to the first embodiment of the present invention.

Next, the backlash compensation data constructing mode 64 will be described below with reference to FIGS. 2, 7, and 9. In this mode, the error which occurs in the cylinder servo motor due to backlash is obtained, and is stored in the compensation memory 23 along with θ.

It is considered that the amount of backlash varies with a load applied to the ball screw 5. Since the load applied to the ball screw 5 is proportional to a torque applied on the servo motor unit 1 and the torque applied on the servo motor unit 1 is proportional to a current applied to the servo motor unit 1, the amount of backlash can be estimated as follows:

$$\text{Amount of backlash} = g(\theta, i) \quad (2)$$

wherein θ is the detection angle obtained from the rotation detector 28 of the servo motor unit 1, i is the current, and g is a function for calculating the amount of backlash from the amount of rotation of the servo motor unit 1 and the current.

In addition, the following approximation can be made by a first order Taylor expansion of the function g(θ,i):

$$\text{Amount of backlash} = g(\theta, 0) + \frac{\partial g}{\partial i}\bigg|_{i=0} i \quad (3)$$

In the backlash compensation data constructing mode 64, the backlash compensation factors g(θ,0) and $$\frac{\partial g}{\partial i}\bigg|_{i=0}$$

are determined. As described above, in the pitch error compensation data constructing mode 63, the provisional backlash data is stored in the temporary memory 42, and one-half of this data represents the backlash compensation factor g(θ,0) in the case in which the load is not applied. Accordingly, the following equation can be obtained:

$$g(\theta, 0) = \frac{\text{Provisional backlash data stored in temporary memory}}{2} \quad (4)$$

Then, a load is applied on a thrust receiver 29 shown in FIG. 2. When the amount of rotation of the servo motor unit 1 is θ, the position of the end portion of the ball screw 5 measured by the length measuring device 11 is L1, the current detected by the detector 27 is i, and the pitch error of the servo motor unit 1 corresponding to θ is ε, the backlash correction factor $$\frac{\partial g}{\partial i}\bigg|_{i=0}$$

under the conditions in which the load is applied can be calculated as follows:

$$\frac{\partial g}{\partial i}\bigg|_{i=0} = \frac{L1 - \{(L \times \theta + \varepsilon) + g(\theta, 0)\}}{i} \quad (5)$$

The part of the equation inside { } represents the estimated position of the end portion of the ball screw 5 after the pitch error and backlash, which occurs when no load is applied, are compensated for.

The above-described calculation is performed by a backlash compensation factor calculator 60, which is installed in the control circuit 21 shown in FIG. 2 as a software program.

The above-described operation will be described below with reference to FIG. 7. First, a load is applied on the thrust receiver 29 shown in FIG. 2, and a movement command corresponding to the operation pattern stored in the command memory 22 is generated. Then, the inverter circuit 25 is driven in a feedback control system constructed of the subtractor 41 and a controller 43, so that the servo motor unit 1 is operated. Then, the backlash compensation factor calculator 60 receives L1, which is the position of the end portion of the ball screw 5 measured by the length measuring device 11; the estimated position of the end portion of the ball screw 5 calculated by the ball screw lead multiplier 53a by multiplying the detection angle θ (amount of rotation) obtained from the rotation detector 28 by the lead length L of the ball screw 5; the pitch error ε corresponding to θ which is stored in the compensation memory 23 in the pitch error compensation data constructing mode 63; the provisional backlash data which is also stored in the temporary memory 42 in the pitch error compensation data constructing mode 63; and the current i detected by the current detector 27. The backlash compensation factor calculator 60, which is installed in the control circuit 21 shown in FIG. 2 as a software program, calculates the backlash compensation factors g(θ,0) and $$\frac{\partial g}{\partial i}\bigg|_{i=0},$$

and constructs a backlash compensation factor table by storing the backlash compensation factors g(θ,0) and $$\frac{\partial g}{\partial i}\bigg|_{i=0}$$

in the compensation memory 23 at the addresses corresponding to θ.

Figure 9A:
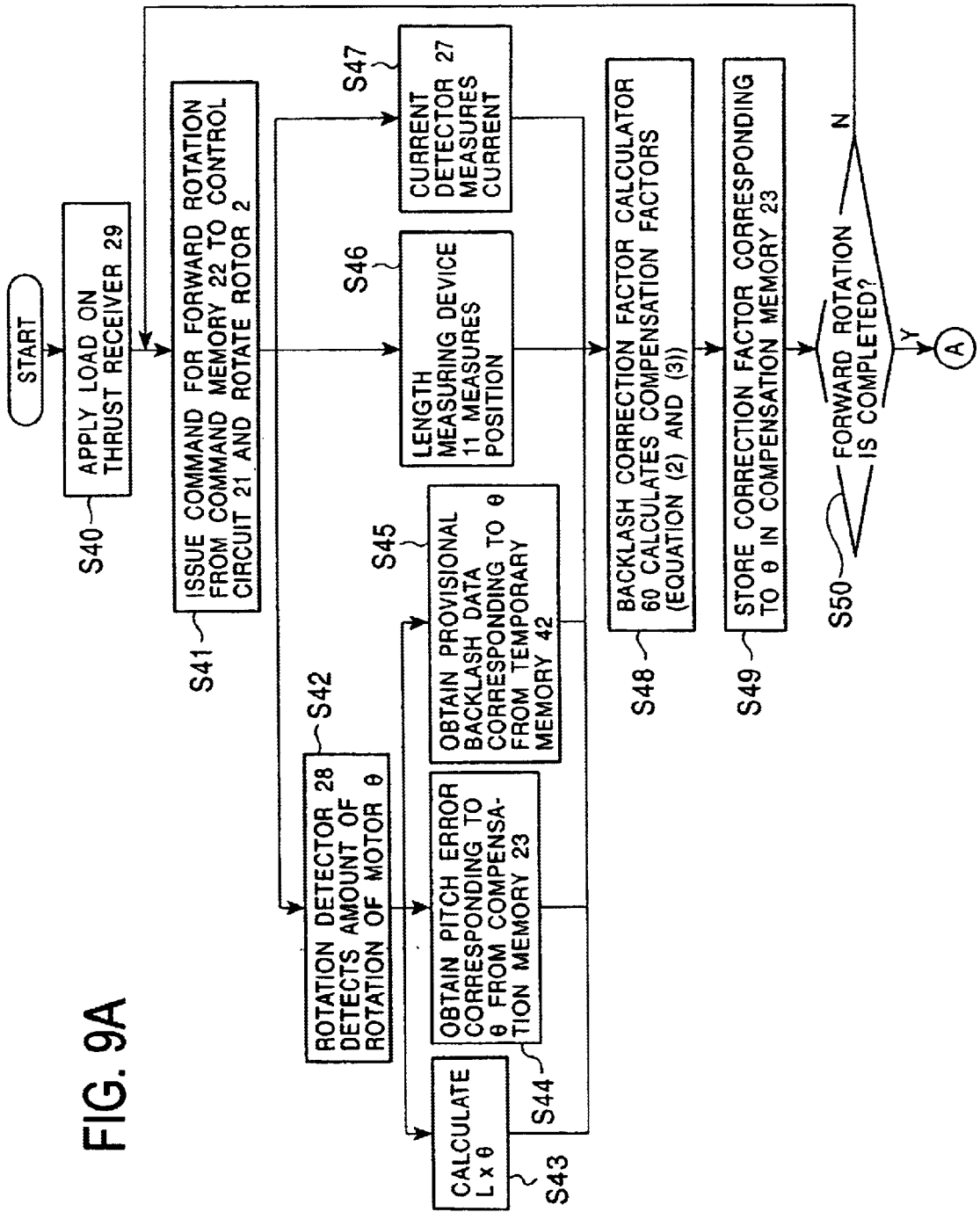
FIGS. 9A and 9B are a flowchart showing an operation of constructing backlash compensation data according to the first embodiment of the present invention.
Figure 9B:
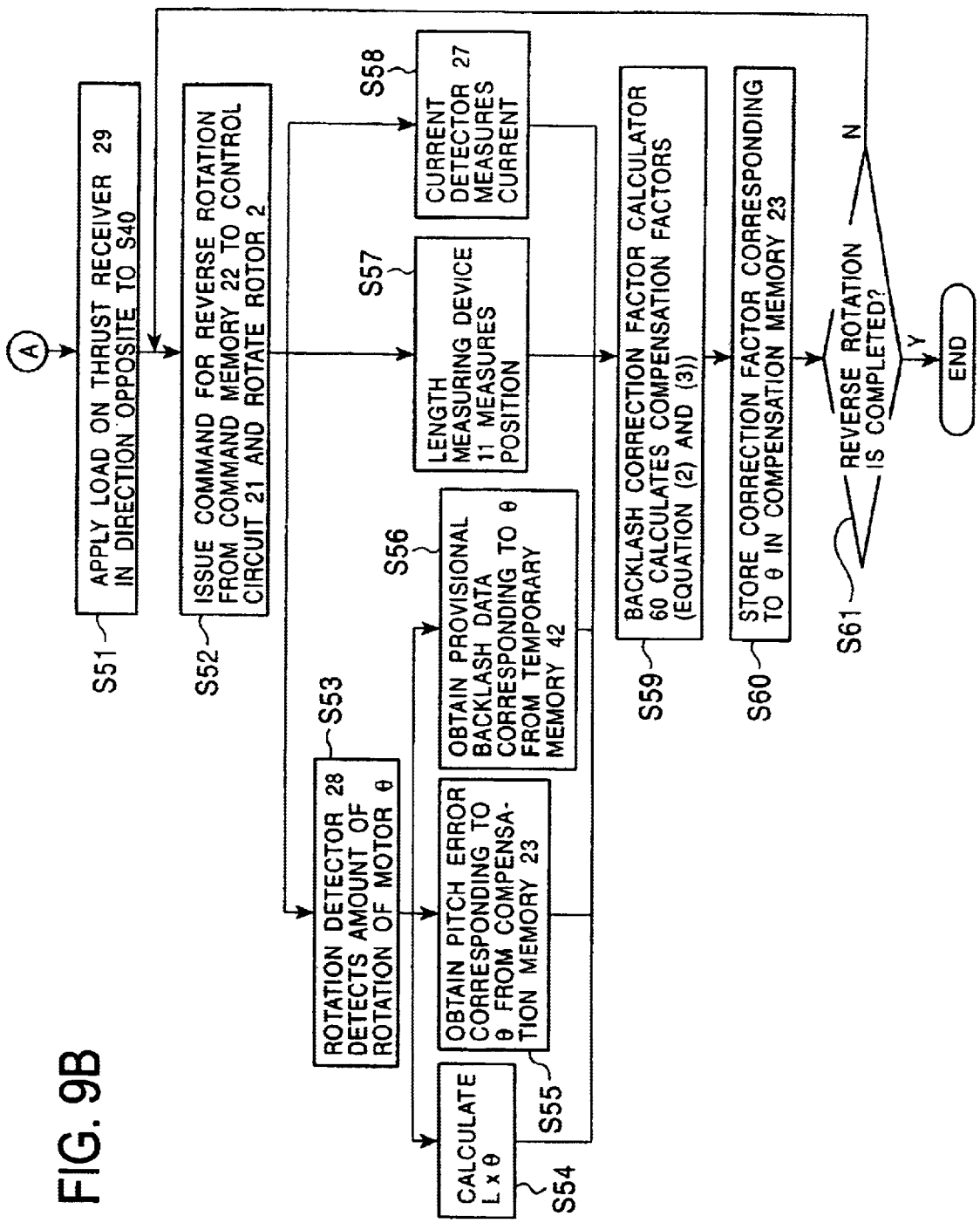

FIGS. 9A and 9B are a flowchart showing the above-described process. First, a load is applied to the thrust receiver 29 (FIG. 2) (S40), and then a command is issued from the command memory 22 to the control circuit 21 so that the rotor 2 of the servo motor unit 1 is rotated forward (S41). Then, the rotation detector 28 detects the detection angle θ (amount of rotation) (S42), and the ball screw lead multiplier 53a (FIG. 7) multiplies the obtained θ by the lead length L of the ball screw 5 (S43). At the same time, the pitch error ε corresponding to θ is obtained from the compensation memory 23 (S44) and the provisional backlash data corresponding to θ is obtained from the temporary memory 42 (S45). In addition, the length measuring device 11 (FIG. 2) measures the position of the end portion of the ball screw 5 (S46) and the current detector 27 detects the current applied to the servo motor unit 1 (S47). Then, the backlash compensation factor calculator 60 (FIG. 7) calculates the compensation factors g(θ,0) and $$\frac{\partial g}{\partial i}\bigg|_{i=0}$$

based on the data obtained at S42 to S47 (S48), and stores g(θ,0) and $$\frac{\partial g}{\partial i}\bigg|_{i=0}$$

in the compensation memory 23 along with θ (S49).

The backlash compensation factor calculator 60 is a program installed in the control circuit 21 for constructing the backlash compensation data, and calculates the backlash compensation factors $g(\theta,0)$ and $$\frac{\partial g}{\partial i}\bigg|_{i=0}$$

using equations (2) and (3). The addresses for storing the backlash compensation factors $g(\theta,0)$ and $$\frac{\partial g}{\partial i}\bigg|_{i=0}$$

in the compensation memory 23 are determined similarly to the pitch error compensation data constructing mode 63.

The amount of backlash may not be the same in both the case in which the load is applied in the positive direction and the case in which the load is applied in the negative direction. In such a case, compensation for backlash must be performed in accordance with the direction in which the load is applied. Accordingly, the correction factors in the case in which the load is applied in the negative direction are also obtained by implementing S51 to S61.

More specifically, after the forward rotation is completed (S50), a load in the opposite direction compared with S40 is applied to the thrust receiver 29 (S51). Then, a command for reverse rotation is issued from the command memory 22 to the control circuit 21, and the rotor 2 of the servo motor unit 1 is rotated in the reverse direction (S52). Then, the rotation detector 28 detects the detection angle θ (amount of rotation) (S53), and the ball screw lead multiplier 53a (FIG. 7) multiplies the obtained θ by the lead length L of the ball screw 5 (S54). At the same time, the pitch error ε corresponding to θ is obtained from the compensation memory 23 (S55) and the provisional backlash data corresponding to θ is obtained from the temporary memory 42 (S56). In addition, the length measuring device 11 (FIG. 2) measures the position of the end portion of the ball screw 5 (S57) and the current detector 27 detects the current applied to the servo motor unit 1 (S58). Then, the backlash compensation factor calculator 60 (FIG. 7) calculates the compensation factors $g(\theta,0)$ and $$\frac{\partial g}{\partial i}\bigg|_{i=0}$$

based on the data obtained at S53 to S58 (S59) and stores $g(\theta,0)$ and $$\frac{\partial g}{\partial i}\bigg|_{i=0}$$

to the compensation memory 23 along with θ (S60).

Then, the backlash compensation data constructing mode 64 ends when the reverse rotation is completed (S61).

Since the provisional backlash data stored in the temporary memory 42 at S38 in the flowchart shown in FIG. 6 is not used in the following processes, memory area corresponding to this data may be cleared.

Next, the temperature compensation data constructing mode 65 will be described below with reference to FIGS. 2, 10, and 11. In the temperature compensation data constructing mode 65, data for compensating for thermal expansion and contraction of the ball screw 5, the ball nut 4, etc., which occur due to temperature variation, is obtained and stored in the compensation memory 23. The thermal expansion of the ball screw 5, etc. can be theoretically calculated from the shape and material thereof. However, in the present embodiment, thermal expansion of the ball screw 5 is measured in the following method.

First, the ball screw 5, which is the output axis of the cylinder servo motor, is extracted to the limit. Then, the measurement data obtained from the length measuring device 11 is input. The temperature in the above-described positioning error operation is detected by the temperature detector 31 shown in FIG. 2, and position Lmax (the measurement data obtained from the length measuring device 11),showing the end portion of the ball screw 5 at the time when the temperature is T1, is stored. Then, the cylinder servo motor is heated to T2, which is the maximum temperature at which the operation of the cylinder servo motor is guaranteed, and Lmax', which is the position of the end portion of the ball screw 5 at the time when the temperature is T2, is measured by the length measuring device 11. Then, a compensation factor $\epsilon_T$ is calculated as:

$$\text{Compensation factor } \varepsilon_T = \frac{L\max' - L\max}{T2 - T1} \quad (6)$$

and is stored in the compensation memory 23.

The above-described operation will be described below with reference to FIG. 10. In the figure, a sampling circuit 47, a compensation data calculator 48, a sampling command unit 49, and a differential circuit 72 are constructed of software programs installed in the control circuit 21. The differential circuit 72 calculates rotational speed by differentiating θ, which is output from the rotation detector 28, with respect to time and outputs the rotational speed to the sampling command unit 49. The sampling command unit 49 issues a command to the sampling circuit 47 when the temperature or the rotational speed of the motor is a predetermined value. In the present embodiment, the sampling command unit 49 issues a command to the sampling circuit 47 when the rotational speed is detected to be 0 or when the temperature is detected to be T2. When the sampling circuit 47 receives the command from the sampling command unit 49, it samples the data input from the input/output unit 26 and outputs the data to the compensation memory 23 or to the temporary memory 42. The compensation data calculator 48 calculates the compensation factor $\epsilon_T$ based on the above-described equation (6).

Figure 10:
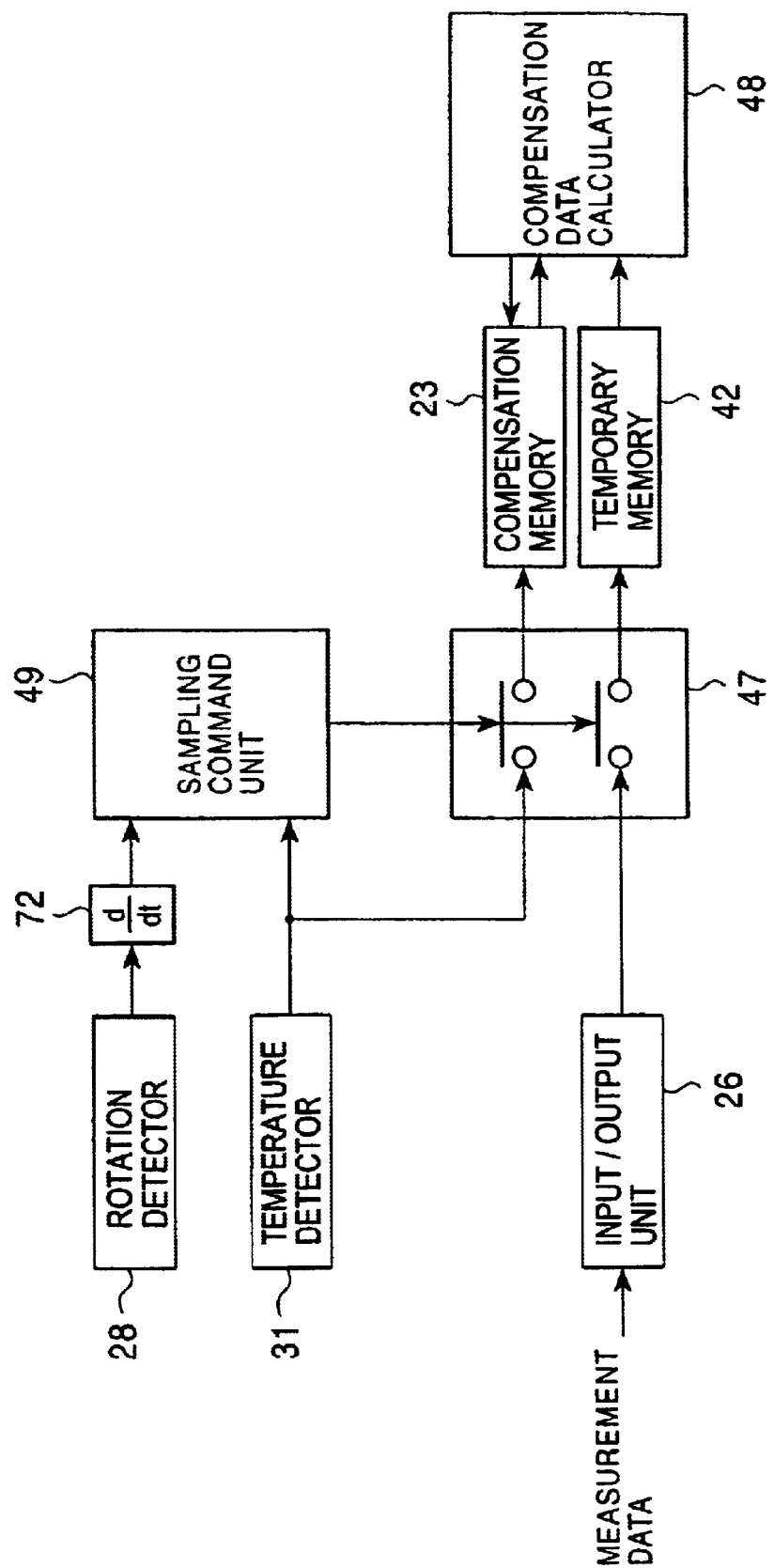
FIG. 10 is a control block diagram showing an operation of constructing temperature compensation data according to the first embodiment of the present invention.

First, a movement command is generated based on the operation pattern stored in the command memory 22, and the servo motor unit 1 contained in the cylinder servo motor is operated such that the ball screw 5 is extracted to the limit (not shown in FIG. 10). When the above-described operation is completed, the rotational speed of the servo motor unit 1 (FIG. 2) output from the differential circuit 72 becomes 0. Thus, the sampling command unit 49 detects that the rotational speed is 0 and activates the sampling circuit 47. The sampling circuit 47 samples the measurement data of the position of the end portion of the ball screw 5 which is input from the input/output unit 26 and stores it in the temporary memory 42 as Lmax. At the same time, the temperature T1 detected by the temperature detector (thermistor) 31 is stored in the compensation memory 23. Then, the cylinder servo motor is heated in a constant temperature oven (not shown), etc. When the temperature detector 31 detects that the temperature is T2, the sampling command unit 49 activates the sampling circuit 47. Then, the sampling circuit 47 outputs the position of the end portion of the ball screw 5, which is determined by the length measuring device 11 (FIG. 2) and input from the input/output unit 26 (FIG. 2), to the temporary memory 42 as Lmax'. The compensation data calculator 48, which is a program installed in the control circuit 21 for constructing temperature compensation data, calculates the compensation factor $\epsilon_T$ from Lmax and Lmax' stored in the temporary memory 42, the temperature T1 stored in the compensation memory 23, and the temperature T2, using the above-described equation (6), and stores it in the compensation memory 23.

Figure 11:
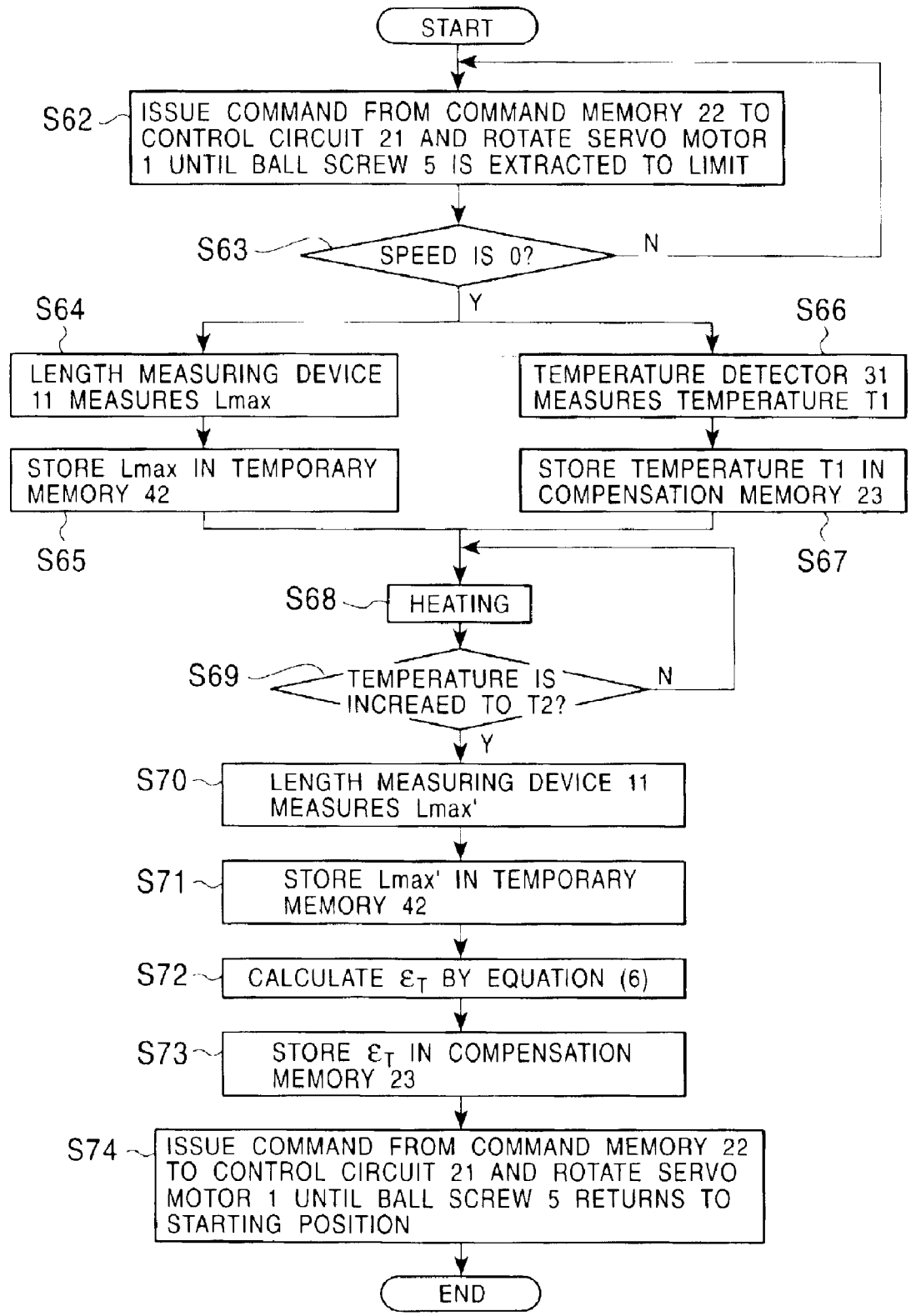
FIG. 11 is a flowchart showing the operation of constructing temperature compensation data according to the first embodiment of the present invention.

FIG. 11 is a flowchart of the above-described process. First, a command is issued from the command memory 22 to the control circuit 21 so that the servo motor unit 1 is rotated until the ball screw 5 is extracted to the limit (S62). Stopping of the servo motor unit 1 means that the ball screw is extracted to the limit. Thus, when the rotation detector 28 detects that the speed is 0 (S63), the position of the end portion of the ball screw 5 measured by the length measuring device 11 is stored in the temporary memory 42 as Lmax (S64 and S65). At the same time, the temperature T1 detected by the temperature detector 31 is stored in the compensation memory (S66 and S67). Next, the cylinder servo motor is heated (S68), and, when the temperature detector 31 detects that the temperature is T2 (S69), the position of the end portion of the ball screw 5 measured by the length measuring device 11 is stored in the temporary memory 42 as Lmax' (S70 and S71). Then, the compensation data calculator 48 calculates the compensation factor $\epsilon_T$ based on the temperature T2 and the above-described data (Lmax, Lmax', and T1) stored in the temporary memory 42 and the compensation memory 23, using the equation (6) (S72), and stores the calculated result, that is, the compensation factor $\epsilon_T$, to the compensation memory 23 (S73). Lastly, a command is issued from the command memory 22 to the control circuit 21 and the servo motor unit 1 is rotated such that the ball screw 5 returns to the starting position (S74), and then the temperature compensation data constructing mode 65 ends. Since the data (Lmax and Lmax') stored in the temporary memory 42 at S65 and S71 are not used in the following processes, memory area corresponding to these data may be cleared.

Next, the normal operation mode 61 will be described below with reference to FIGS. 1 and 12 to 14.

FIG. 1 shows the construction of the cylinder servo motor in the normal operation mode 61. In the figure, a position command is output from the external command device 19 and is input to the control circuit 21 via the input/output unit 26. The control circuit 21 compensates for the error using the data stored in the compensation memory 23, and drives the inverter circuit 25 so as to servo control the servo motor unit 1. The servo motor unit 1 is operated such that the ball nut 4, which is fixed in the axial direction in a rotatable manner, is rotated. The ball screw 5, which is fixed in the rotating direction in a manner movable in the axial direction, is moved forward and backward along with the rotation of the ball nut 4. The displacement of the ball screw 5 is determined based on the amount of rotation of the ball nut 4, and the rotation detector 28, which rotates together with the ball nut 4, detects the amount of rotation of the ball nut 4.

Figure 12:
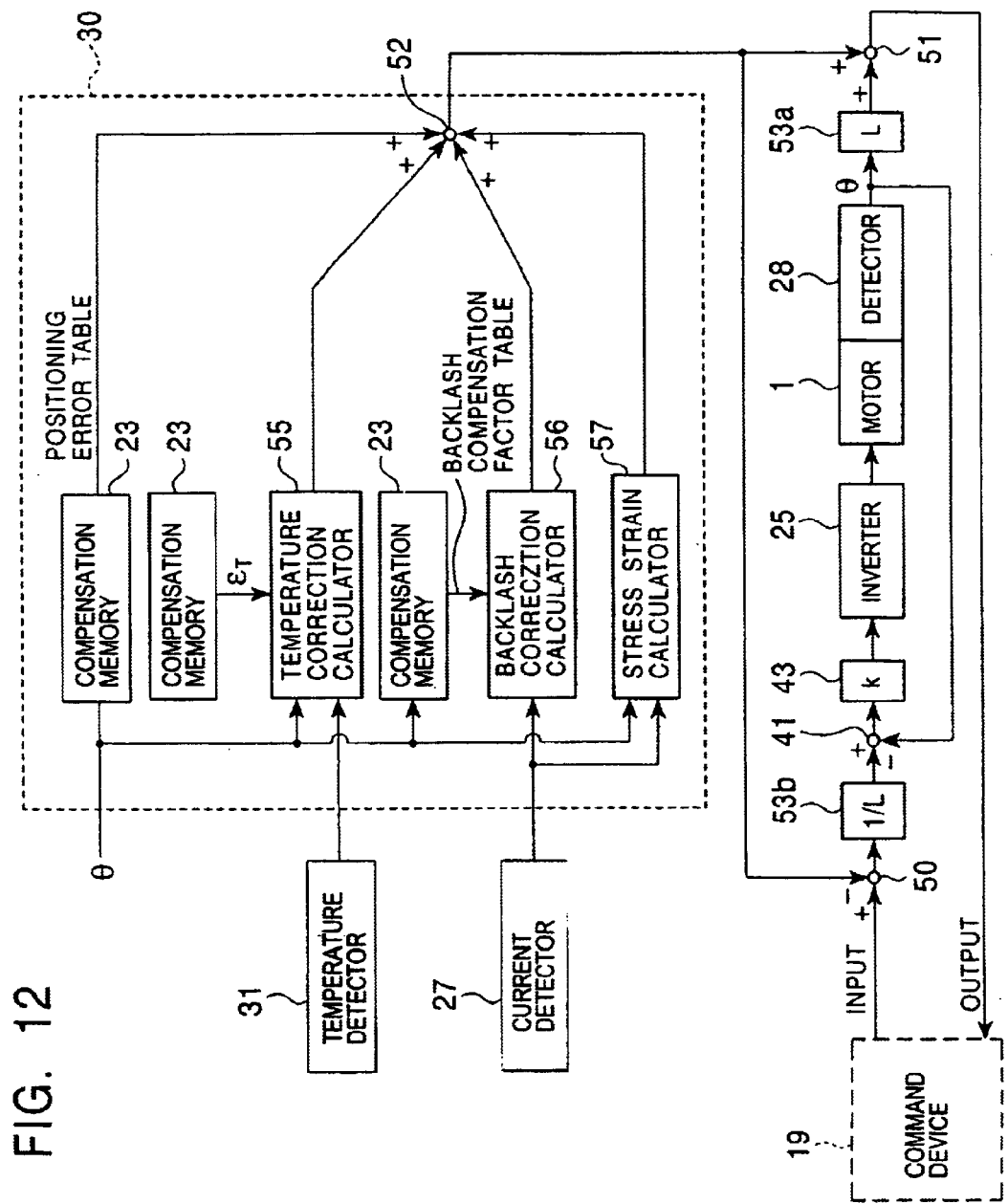
FIG. 12 is a control block diagram of a normal operation according to the first embodiment of the present invention.

Next, the normal operation mode will be described below with reference to a control block diagram shown in FIG. 12. The position command input from the external command device 19 is compensated by a subtractor 50 using an estimated error obtained from a positioning error estimation unit 30, so that a compensated position command in which the error is taken into account is obtained. Then, a ball screw lead divider 53b converts the compensated position command to a servo motor rotation command. The inverter circuit 25 is driven in a feedback control system constructed of the subtractor 41 and the controller 43, so that the servo motor unit 1 is operated. A current position data output to the external command device 19 is calculated by multiplying the detection angle θ obtained from the rotation detector 28 by the lead length of the ball screw 5 at the ball screw lead multiplier 53a and adding the estimated error obtained from the positioning error estimation unit 30 to the output of the ball screw lead multiplier 53a at an adder 51. In FIG. 12, the same circuits as those shown in FIG. 1 and are denoted by the same reference numerals. In addition, the positioning error estimation unit 30 excluding the compensation memory 23, the subtractor 50, the ball screw lead divider 53b, the subtractor 41, the ball screw lead multiplier 53a, and the adder 51 are constructed of software programs installed in the control circuit 21 shown in FIG. 1. In addition, the positioning error table and the backlash compensation factor table are stored in the compensation memory 23 as the compensation data.

Next, the operation of the positioning error estimation unit 30 will be described below.

With respect to the compensation for error due to the accuracy of the components and accuracy of the detector (pitch error compensation), the error corresponding to the detection angle θ of the servo motor unit 1 detected by the rotation detector 28 is obtained from the positioning error table, and is output to an adder 52.

With respect to contraction of the ball screw 5 due to the temperature variation, first, a temperature compensation calculator 55 calculates a compensation value based on the temperature detected by the temperature detector 31, the detection angle θ detected, by the rotation detector 28, and the compensation factor $\epsilon_T$ stored in the compensation memory 23. Then, the obtained compensation value is output to the adder 52. When the lead of the ball screw 5 is L, the rotation angle of the rotor 9 is θ, when the position at θ=0 is L0, and when the difference between the temperature T1 (the initial temperature at the time at which the temperature compensation data stored in the compensation memory 23 is constructed) and the detection temperature is T, the compensation value for thermal expansion is calculated as follows:

$$\text{Temperature compensation value} = \frac{L \cdot \theta + L0}{L\max} \epsilon_T (T - T1) \quad (7)$$

With respect to the compensation for backlash, first, a backlash compensation calculator 56 obtains the backlash compensation factors corresponding to the detection angle θ detected by the rotation detector 28 from the backlash compensation factor table stored in the compensation memory 28. In addition, the current i detected by the current detector 27 is input to the backlash compensation calculator 56. Then, the backlash compensation calculator 56 calculates the amount of backlash and outputs the amount of backlash to the adder 52. The backlash compensation calculator 56 is constructed of a software program that calculates equation (3), and is installed in the control circuit 21.

In addition, in the case in which a thrust is applied to the ball screw 5, generating of a thrust due to the ball screw 4 causes an error in the position of the end portion of the output shaft by a strain. The strain is proportional to the thrust, which is proportional to the torque applied to the servo motor unit 1. In addition, the torque applied to the servo motor unit 1 is proportional to the current applied to the servo motor unit 1. Since the Young's modulus of the material forming the ball screw 5 and the diameter of the ball screw 5 can be assumed to be constant, it can be considered that the spring constant (elastic modulus) of the ball screw 5 is proportional to the distance from the ball nut 4 to the end portion of the ball screw 5. More specifically, when a torque constant of the servo motor unit 1 is $k_T$, the product of the Young's modulus of the material forming the ball screw 5 and the cross section of the ball screw 5 is k, the rotation angle of the servo motor is θ, the lead length of the ball screw 5 is L, the ball screw efficiency is η, the length from the ball nut 4 to the end portion of the ball screw 5 at θ=0 is $L_O$, and the current i detected by the current detector 27 is i, the strain can be calculated as follows:

$$\text{Strain} = \frac{\frac{2\pi(k_T i)\eta}{L}}{\frac{k}{L\theta + L_o}} \qquad (8)$$

In the above-described equation, the numerator represents the thrust applied to the servo motor unit 1 with a built-in amplifier, and the denominator represents the spring constant.

More specifically, in FIG. 12, the current i detected by the current detector 27 is input to a strain calculator 57, which calculates the strain using equation (8) and outputs the calculated result to the adder 52.

Figure 13:
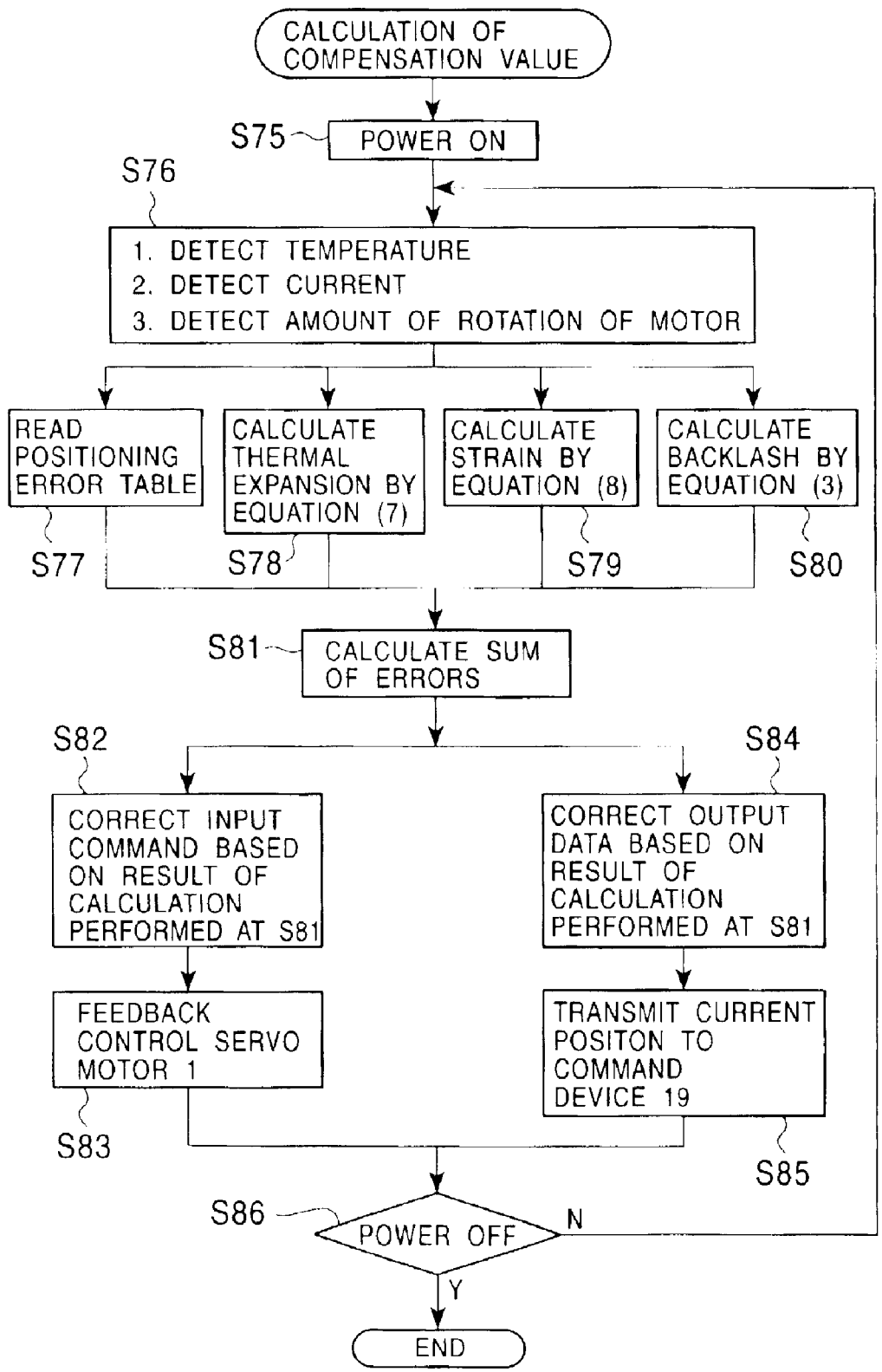
FIG. 13 is a flowchart showing the normal operation according to the first embodiment of the present invention.

Lastly, the compensation in the normal operation mode will be described below using a flowchart shown in FIG. 13 and referring to FIGS. 1 and 12. With reference to FIG. 13, after the power is turned on (S75), the detection angle θ of the servo motor unit 1 is detected by the rotation detector 28, the temperature T is detected by the temperature detector 31, and the current i is detected by the current detector 27 (S76). Then, the positioning error corresponding to the rotation angle θ is obtained from the positioning error table stored in the compensation memory 23 (S77). At the same time, the temperature compensation calculator 55 calculates the thermal expansion due to the increase in temperature based on the temperature T, the rotation angle θ, etc., using equation (7) (S78). In addition, the strain calculator 57 calculates the strain caused by the thrust based on the current i, the rotation angle θ, etc., using equation (8) (S79). In addition, the backlash compensation calculator 56 calculates the amount of backlash based on the rotation angle θ, the current I, etc., using equation (3) (S80). Then, the sum of the above-described data is calculated by the adder 52 shown in FIG. 12 as the compensation data (S81). The above-described S77 to S81 are performed in the positioning error estimation unit 30 shown in FIG. 12. Next, the input command is compensated by the subtractor 50 shown in FIG. 12 based on the result of calculation performed at S81 (S82), and then the servo motor unit 1 is feedback-controlled (S83). In order to improve monitoring accuracy, the output data is compensated by the adder 51 shown in FIG. 12 (S84), and is output (transmitted) to the external command device 19 as a current position (S85).

Figure 14:
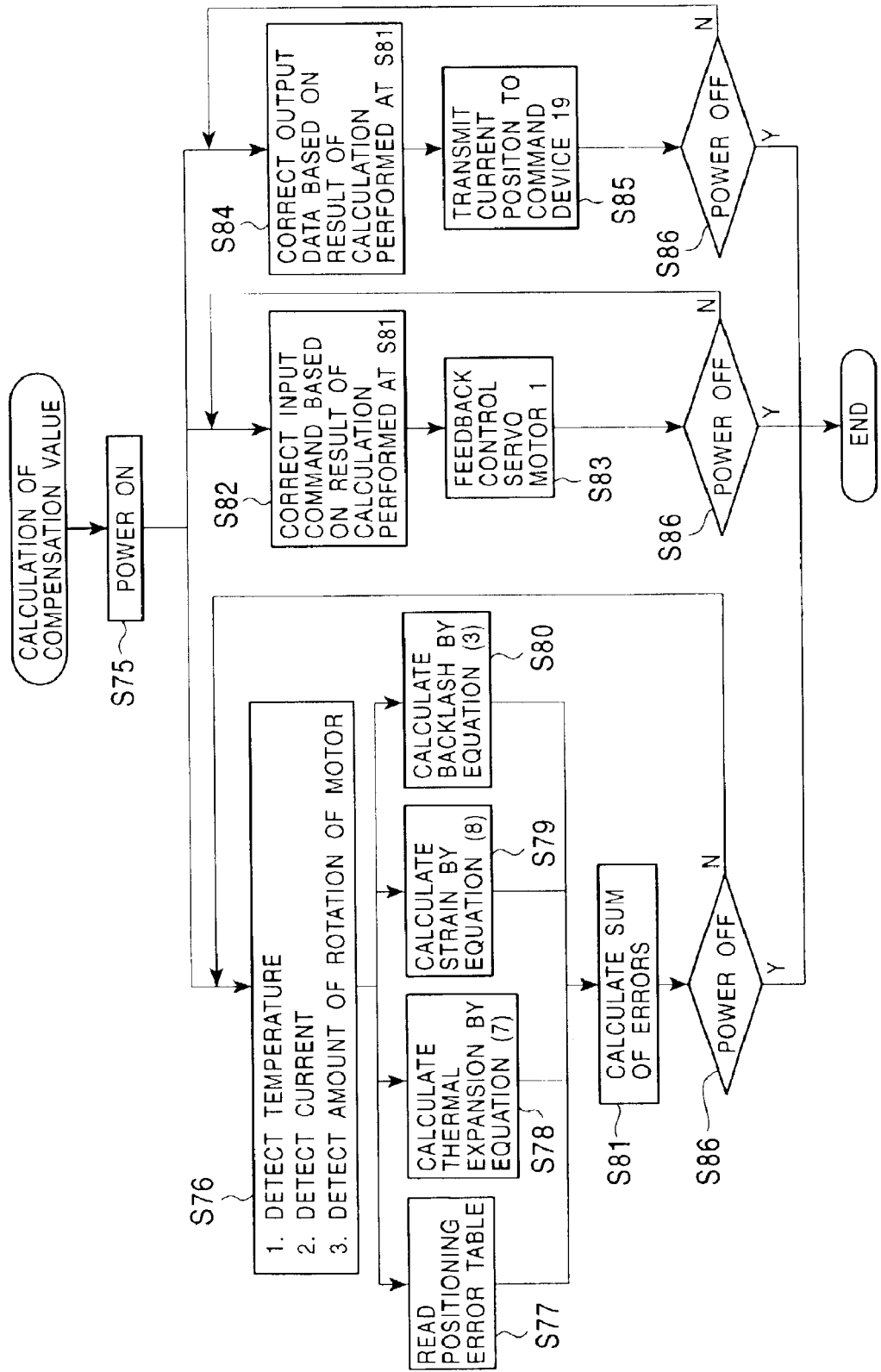
FIG. 14 is a flowchart showing a modification of the first embodiment of the present invention.

As shown in FIG. 14, S76 to S81, S82 and S83, and S84 and S85 in FIG. 13 may also be performed asynchronously. More specifically, the feedback operation (S83) may be implemented at a high speed, and the calculation of compensation data (S76 to S81) and output to a host controller (external command device) (S84 and S85) may be implemented at a relatively low speed. Thus, S76 to S81, S82 and S83, and S84 and S85 may also be performed asynchronously.

Second Embodiment

Next, a second embodiment will be described below with reference to FIGS. 15 to 21.

According to the second embodiment, when errors due to age deterioration and/or disassembling for repair occur in the cylinder servo motor after it is installed in a mechanical apparatus, the data for compensating for the positioning error (pitch error) can be easily corrected without taking out the cylinder servo motor from the mechanical apparatus.

Figure 15:
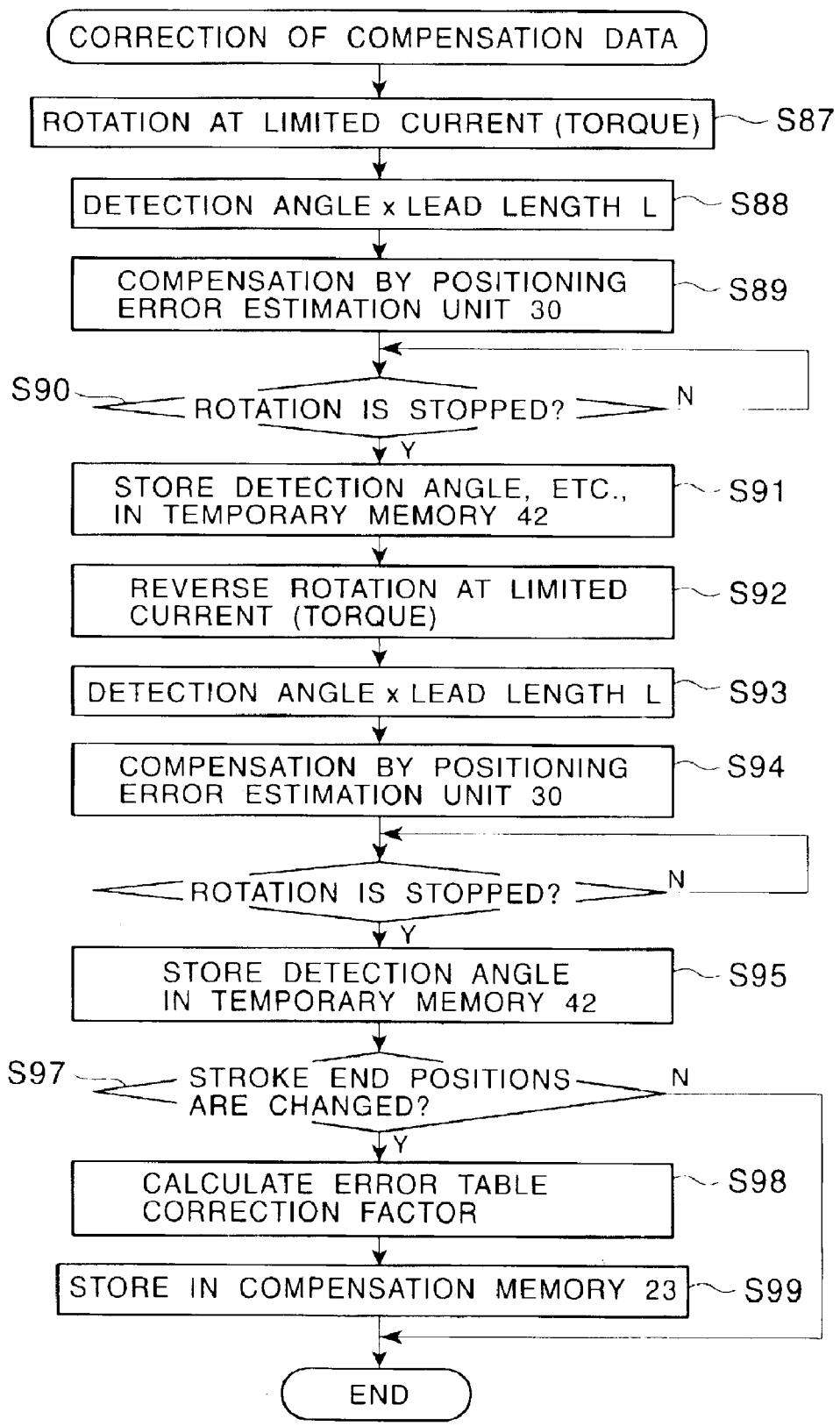
FIG. 15 is a flowchart showing an operation according to a second embodiment of the present invention.
Figure 16:
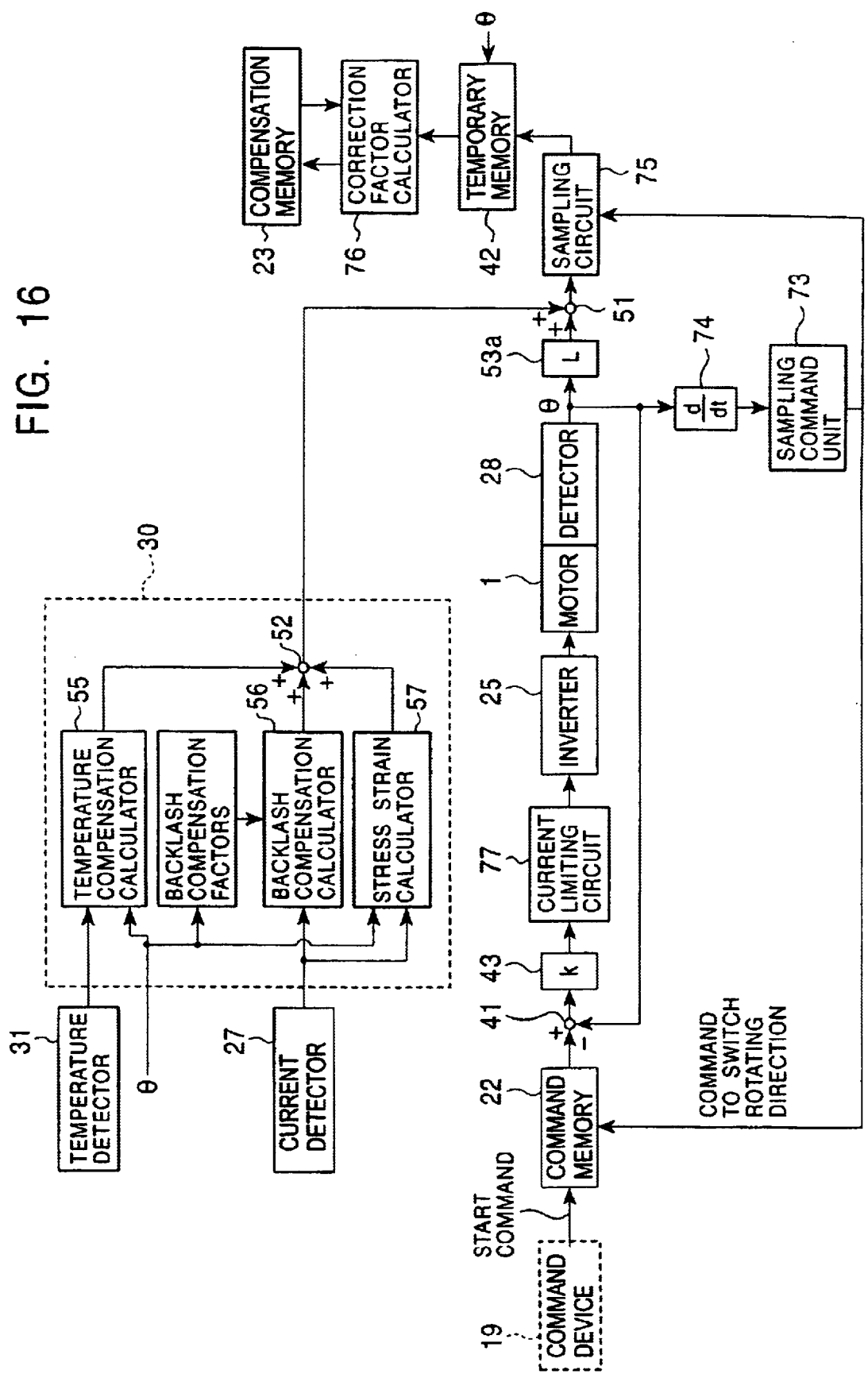
FIG. 16 is a control block diagram showing an operation according to the second embodiment of the present invention.

FIG. 15 is a flowchart showing a process of correcting the compensation data, and FIG. 16 is a block diagram showing the process. First, a command for forward rotation is issued from the command memory 22, and the servo motor unit 1 is servo controlled while the torque is limited by the subtractor 41, the controller 43, and a current limiting circuit 77 (S87). A differential circuit 74 calculates a rotational speed by differentiating the detection angle, which is obtained from the rotation detector 28, with respect to time and outputs the rotational speed to a sampling command unit 73. In addition, the ball screw lead multiplier 53a multiplies the detection angle by the lead length L of the ball screw 5 (S88). The output from the ball screw lead multiplier 53a is compensated by adding the error obtained from the positioning error estimation unit 30 (excluding the pitch error) (S89), and the compensated data is output to a sampling circuit 75. Then, when the sampling command unit 73 determines that the rotation of the servo motor unit 1 is stopped based on the data obtained from the differential circuit 74 (S90), it determines that the ball screw 5 has reached a stroke end and issues a command to the sampling circuit 75. When the sampling circuit 75 receives the command from the sampling command unit 73, it stores an estimated stroke end position, which is calculated by multiplying the detection angle by the lead length L and compensating the calculated result by adding the error obtained from the positioning error estimation unit 30, in the temporary memory 42 along with the detection angle (S91). The command from the sampling command unit 73 is also output to the command memory 22. Thus, after the forward rotation is stopped, the servo motor unit 1 is rotated in the reverse direction and the estimated stroke end position at the opposite stroke end is also stored in the temporary memory 42 along with the detection data (S92 to 96). Next, a correction factor calculator 76 compares the estimated stroke end positions after age deterioration and/or the disassembling for repair, which are stored in the temporary memory 42, with the actual (initial) stroke end positions stored in the compensation memory 23 (S97). With respect to the actual stroke end position, each mechanical apparatus has individual, known stroke end positions, and these stroke end positions will be hereinafter denoted as $L_0$ and $L_1$ (see FIG. 17). When there are errors between the estimated stroke end positions and the actual stroke end positions, the correction factor calculator 76 calculates correction factors for the pitch error (that is, the compensation data for the pitch error) recorded in the positioning error table in the compensation memory 23 in association with the detection angle (S98), and stores the correction factors in the compensation memory 23 (S99). The correction factors are used for compensating the detection angle in the process of obtaining the pitch error, which is stored in the positioning error table in association with the detection angle, so that the pitch error corresponding to the compensated detection angle can be obtained. This will be explained in detail in the following descriptions with reference to FIGS. 17 to 23. The correction factor calculator 76 calculates (the actual stroke end position $L_1$)−(the estimated stroke end position in forward rotation)= error, and (the actual stroke end position $L_0$)−(the estimated stroke end position in reverse rotation)=error. Then, the correction factor calculator 76 compares the calculated errors with the pitch errors at the actual stroke end positions $L_0$ and $L_1$ which are stored in the compensation memory 23. When the differences between the calculated errors and the pitch errors at the actual stroke end positions $L_0$ and $L_1$ are 0, it is determined that the calculation of the correction factors is not necessary even after age deterioration and/or disassembling for repair. When the differences between the calculated errors and the pitch errors at the actual stroke end positions $L_0$ and $L_1$ obtained from the compensation memory 23 are not 0, it is determined that the calculation of the correction factors is necessary. Thus, in such a case, the correction factors are calculated and stored in the compensation memory 23.

In FIG. 16, the current limiting circuit 77, the sampling command unit 73, the sampling circuit 75, the differential circuit 74, and the correction factor calculator 76 are constructed of software programs installed in the control circuit 21 shown in FIG. 2.

Next, the correction factors used for compensating the detection angle in the process of obtaining the pitch error (that is, the compensation data for the pitch error), which is stored in the positioning error table in association with the detection angle, and the correction factor calculator 76 for calculating the correction factors will be described below.

Figure 18:
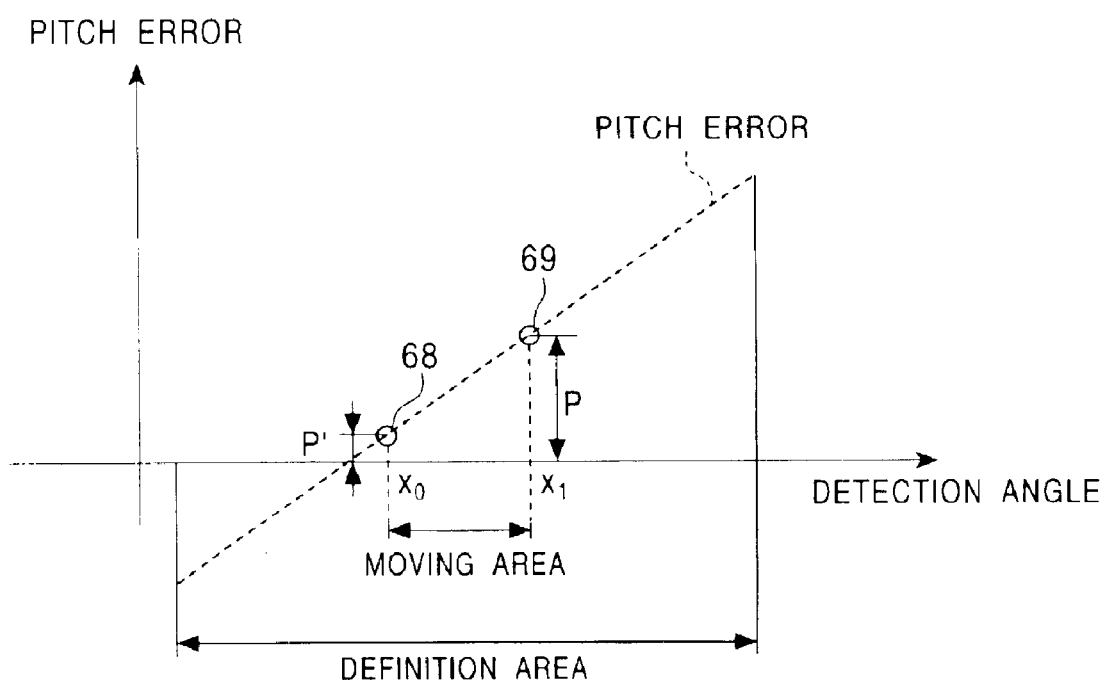
FIG. 18 is a graph showing the relationship between a pitch error and the detection angle obtained by the rotation detector according to the second embodiment of the present invention.

As shown in FIG. 18, when the pitch error stored in the compensation memory 23 is plotted in a graph in which the horizontal axis represents the detection angle x obtained from the rotation detector 28 and the vertical axis represents the pitch error, the pitch error can be expressed by a function $e=f(x)$. The fact that the detection angle stored in the compensation memory 23 in association with the pitch error is corrected and the pitch error corresponding to the corrected detection angle is obtained in the process of compensating for the pitch error is equivalent in the effect to correcting the function $f(x)$. In the following descriptions, the correction factors and the correction factor calculator 76, which calculates the correction factors, will be described in conjunction with the function $f(x)$ and the graph of the error curve $e=f(x)$.

In the descriptions below, it is assumed that errors due to backlash and strain do not vary, and that the compensations excluding the pitch error compensation (temperature compensation, backlash compensation, and strain compensation) are completed.

The stroke end positions, the detection angles obtained from the rotation detector 28 immediately after the cylinder servo motor has been installed in the mechanical apparatus before shipment, and the detection angles obtained from the rotation detector 28 at re-measurement (when errors due to age deterioration and/or disassembling for repair have occurred), are defined as follows:

| Stroke end position | Initial detection angle | Detection angle obtained at re-measurement |
|---|---|---|
| $L_0$ | $X_0$ | $X_0 + \epsilon$ |
| $L_1$ | $X_1$ | $X_1 + \epsilon'$ |

Figure 17A:
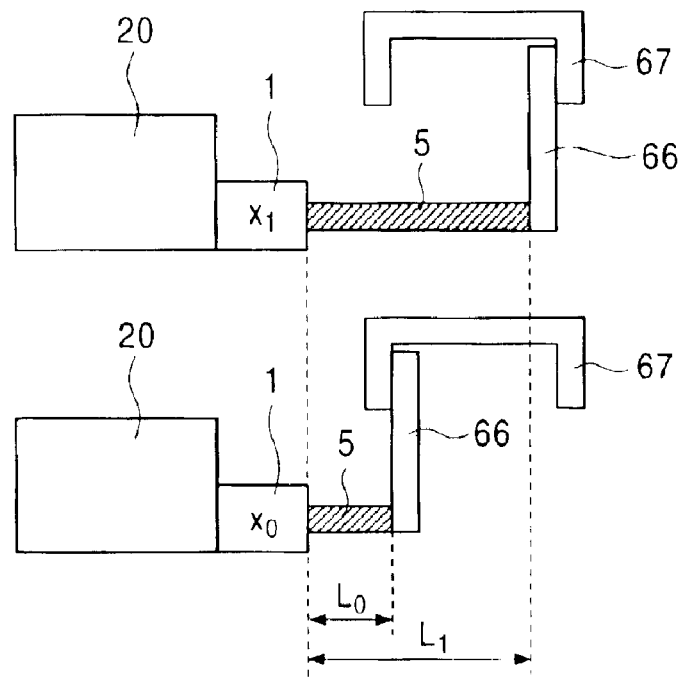
FIG. 17 is a schematic representation showing the relationship between stroke end positions and detection angles obtained by a rotation detector according to the second embodiment of the present invention.
Figure 17B:
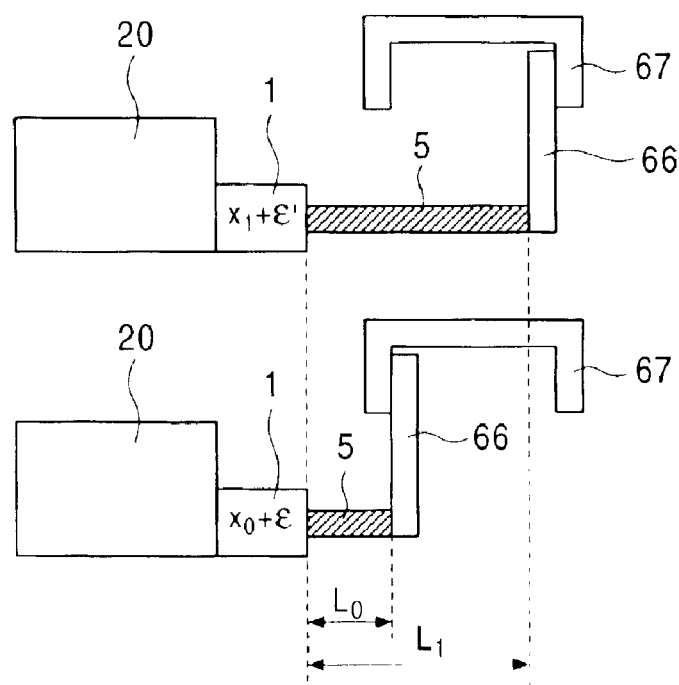

FIG. 17 is a schematic representation showing the above-described values as models. Diagram (a) at the left side shows the state immediately after the cylinder servo motor is installed in the mechanical apparatus before shipment, and diagram (b) at the right side shows the state at the re-measurement (when errors due to age deterioration and/or disassembling for repair have occurred). The upper side in each diagram shows the state in which a bar 66 fixed to the end portion of the ball screw 5 is in contact with one of the side walls of a stopper 67 at the stroke end $L_0$, and the lower side in each diagram shows the state in which the bar 66 fixed to the end portion of the ball screw 5 is in contact with the other side wall of the stopper 67 at the stroke end position $L_1$. The bar 66 and the stopper 67 are models for showing the stroke of the mechanical apparatus in which the cylinder servo motor is installed. In addition, $x_1$, $x_0$, $x_1+\epsilon'$, and $x_0+\epsilon$ show the detection angles obtained from the rotation detector 28 when the end portion of the ball screw 5 is at the stroke ends $L_0$ and $L_1$.

Since it is assumed that the stopper 67 does not move, the stroke end position $L_1$ does not change between the diagrams at the upper side thereof. However, the detection angle obtained from the rotation detector 28 includes the error $\epsilon'$. Similarly, although the stroke end position $L_0$ does not change between diagrams at the lower side thereof, the detection angle obtained from the rotation detector 28 includes the error $\epsilon$.

Although the data for correcting the errors can be obtained only at the two stroke end positions $L_0$ and $L_1$, the shape of the error curve between the two positions can be assumed to be similar to the shape of the error curve obtained in advance. It can be considered that the above-described errors $\epsilon$ and $\epsilon'$, which occur at the re-measurement when the initial error curve $e=f(x)$ is used for the compensation, are due to the displacement of the error curve $e=f(x)$.

This will be described below with reference to FIGS. 18 to 20.

FIG. 18 is a graph showing $e=f(x)$, where the horizontal axis is the detection angle obtained from the rotation detector 28 and the vertical axis is the pitch error. The dotted line shows the error curve $e=f(x)$. Since the positioning error is the same as the pitch error, the pitch error is p at the position corresponding to the detection angle $x_1$ (that is, the stroke end position $L_1$) and is p' at the position corresponding to the detection angle $x_0$ (that is, the stroke end position $L_0$). In the figure, the definition area corresponds to the original moving area of the cylinder servo motor itself, and the moving area ($x_0$ to $x_1$) corresponds to the moving area after the cylinder servo motor is installed in a mechanical apparatus, that is, (stroke end position $L_1$)–(stroke end position $L_0$).

Figure 19:
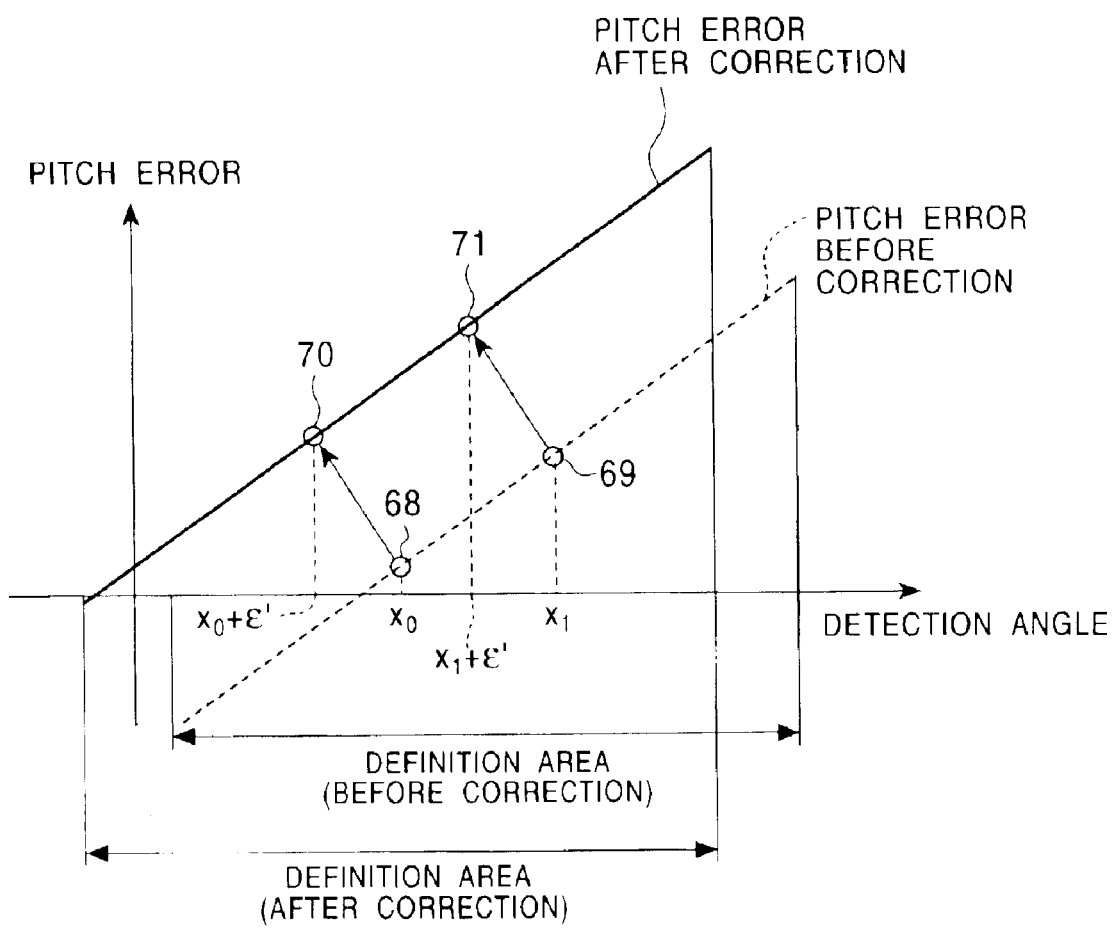
FIG. 19 is a graph showing a manner in which the pitch error is corrected according to the second embodiment of the present invention.

FIG. 19 is a graph showing the state in which points 68 and 69 representing the positioning errors have moved to points 70 and 71, respectively, due to age deterioration and/or disassembling for repair. According to the present embodiment, the error curve $e=f(x)$ (that is, the pitch error compensation data) is corrected based on the assumption that the error curve $e=f(x)$ has moved in parallel due to age deterioration and/or disassembling for repair. In FIG. 19, the error curve $e=f(x)$ has moved in parallel in the direction shown by the arrows.

Figure 20:
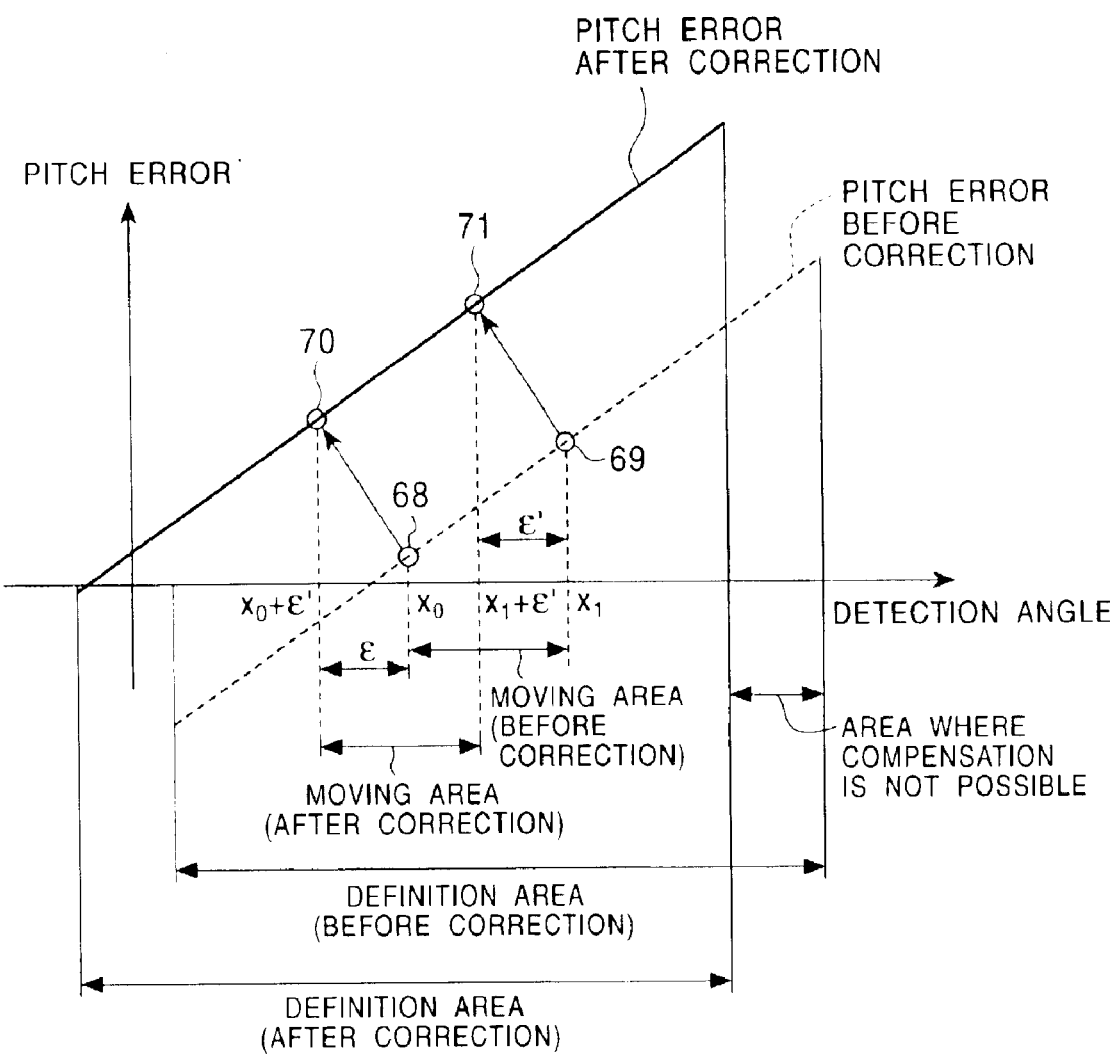
FIG. 20 is a diagram showing in further detail the manner in which the pitch error is corrected according to the second embodiment of the present invention.

FIG. 20 is a graph similar to the graph shown in FIG. 19 to which detailed explanations are added. Although the moving area of the cylinder servo motor itself does not change from the definition area before the correction, as shown in FIG. 20, the definition area after the correction of the error curve is moved to the left compared to the definition area before the correction. Thus, an area which is not covered by the pitch error compensation data and in which the compensation is not possible is generated in the moving area of the cylinder servo motor (see FIG. 20). However, since the area that is actually used is the moving area (after the correction) shown in the figure, this will not be a problem in practice.

Next, on the assumption that the graph of the error curve $e=f(x)$ has moved in parallel to the curve, expressed as e=f(x−a)+b, an example of a method for obtaining correction factors a and b will be explained below. In the example shown in FIGS. 18 to 20, the points 70 and 71 representing the positioning errors are on the graph of the corrected error curve e=f(x−a)+b. However, in practice, even when the error curve e=f(x) is corrected based on parallel movement, it is likely that a pair of correction factors a and b with which the errors at both points 70 and 71 can be completely compensated for does not exist on the curve. Thus, a and b are determined such that estimated errors at the stroke end positions after the correction can be reduced with a small amount of correction (that is, a parallel displacement of the graph of the error curve).

For example, in the case in which the correction factors are determined based on the least-square method, the following equation is used:

$$J=\{L_0-(L(x_0+\epsilon_0)+f(x_0+\epsilon_0-a)+b)\}^2+\{L_1-(L(x_1+\epsilon_1)+f(x_1+\epsilon_1-a)+b)\}^2+\omega^2(a^2+b^2) \quad (9)$$

The correction factors a and b are determined such that the evaluation function J is minimized. The first term in equation (9) corresponds to the amount of error between the actual stroke end position $L_0$ and the stroke end position estimated based on the amount of rotation of the servo motor using the corrected error curve e=f(x−a)+b. In addition, the second term in equation (9) corresponds to the amount of error between the actual stroke end position $L_1$ and the stroke end position estimated based on the amount of rotation of the servo motor using the corrected error curve e=f(x−a)+b. The third term corresponds to the displacement of the parallel movement. In addition, ω is a weight which determines the balance between the parallel displacements a and b and the accuracy of the estimated stroke end positions. When the weight ω is small, more importance is placed on the reduction of the amount of correction than the accuracy of the estimated stroke end positions. In addition, when the weight ω is large, a result in which the accuracy of the estimated stroke end positions is prioritized can be obtained. Accordingly, the error function f(x−a)+b in which a and b are calculated by the above-described method is used as the corrected error function f(x). Since a and b cannot be obtained directly from an explicit function, a and b are repeatedly calculated using the following equations (10) and (11), and a pair of a and b which minimizes the above-described evaluation function J is determined. In addition, a must be in a range that satisfies the following expression:

$$|a|\leq \min(x_0-X_0, X_1-x_1) \quad (10)$$

wherein $X_0$ and $X_1$ are stroke end positions of the cylinder servo motor itself, and $X_0 \leq x_0 \leq x_1 \leq X_1$ is satisfied. More specifically, when a is in the range defined by expression (10), f(x−a)+b can be calculated with respect to any x that is in the range of $x_0 \leq x \leq x_1$ (this is because the data of f(x) is obtained in the range of $X_0 \leq x \leq X_1$ in the operation of constructing the positioning error table according to the first embodiment).

$$a = \max(X_0-x_0, x_1-X_1)+h*i \quad (11)$$

$$b = \frac{\{L_0-(x_0+\varepsilon_0+f(x_0+\varepsilon_0-a))\}+\{L_1-(x_1+\varepsilon_1+f(x_1+\varepsilon_1-a))\}}{2} \quad (12)$$

$$\max(X_0-x_0, x_1-X_1)+h*i \leq \min(x_0-X_0, X_1-x_1) \quad (13)$$

In the above described expressions, h is an increment and i is the number of counts used in the calculation (a positive integer). Expression (13) is obtained by assigning equation (11) to expression (10), which determines the range of a. In addition, equation (12) determines b such that the sum of the errors between the stroke end positions and the estimated stroke end positions obtained from the corrected positioning error table becomes ±0, assuming that a is fixed. These calculations are performed by the correction factor calculator 76.

Figure 21:
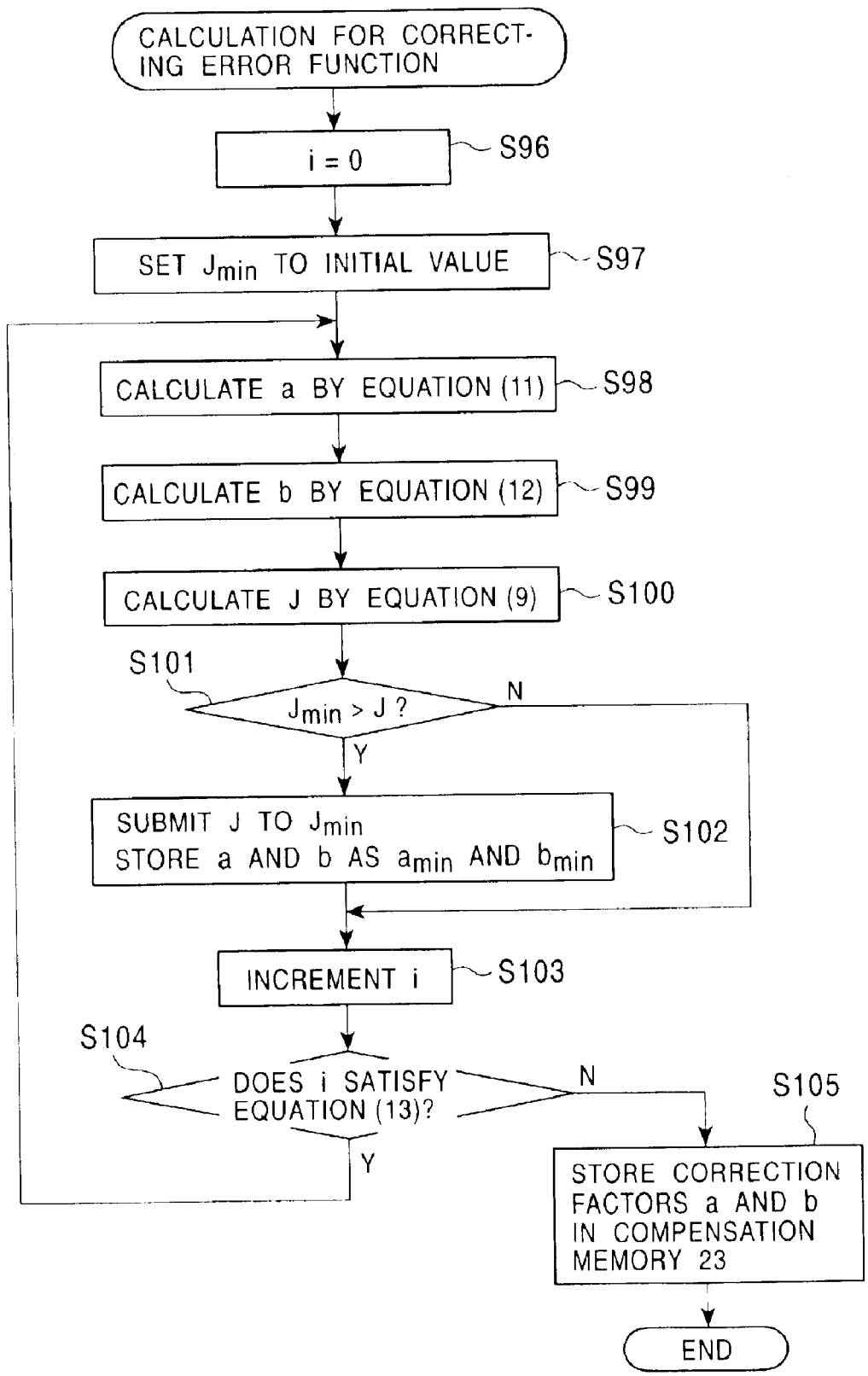
FIG. 21 is a flowchart showing an operation of obtaining correction factors for the pitch error according to the second embodiment of the present invention.
Figure 22:
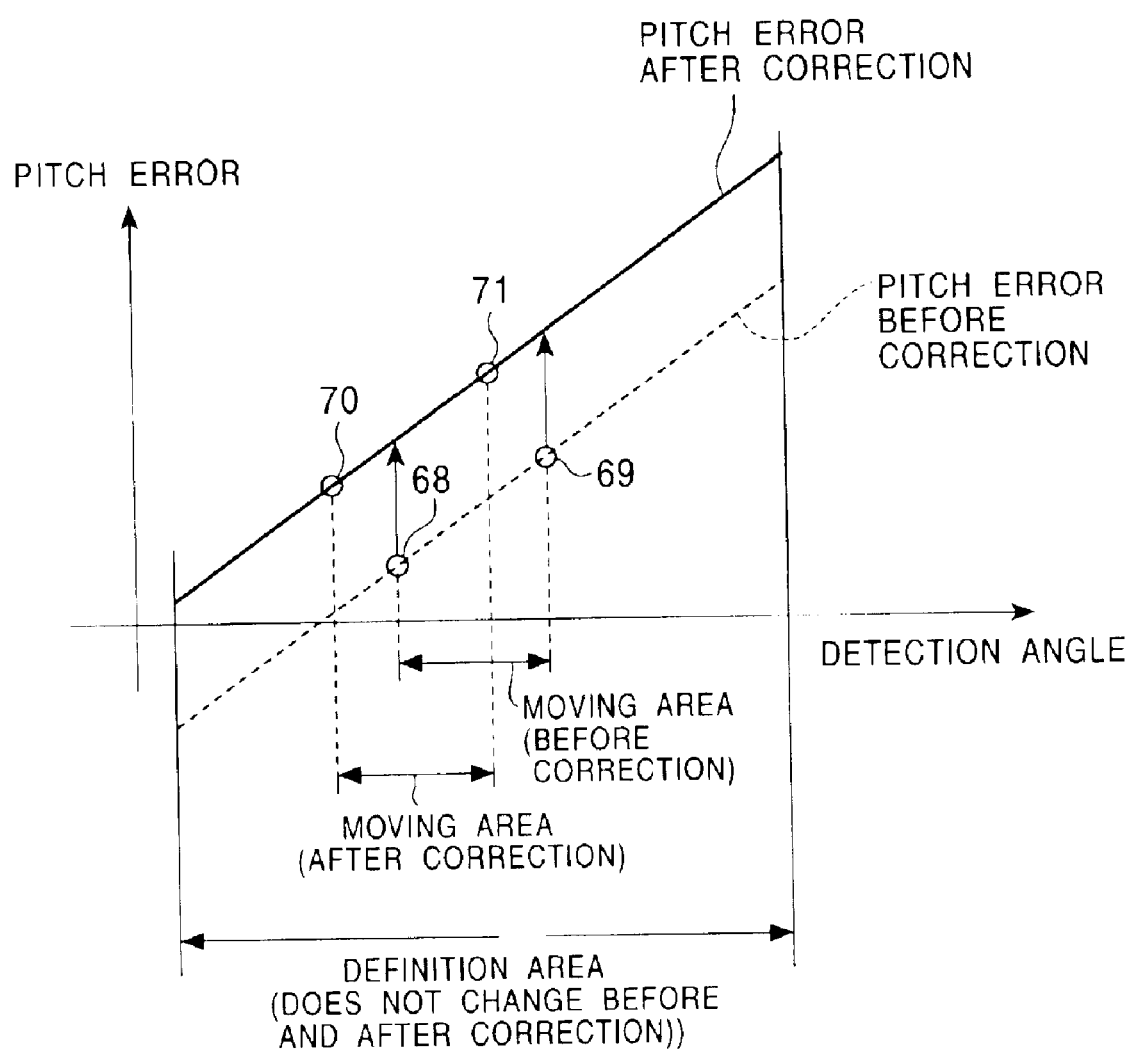
FIG. 22 is a diagram showing a manner in which the pitch error is corrected according to a third embodiment of the present invention.
Figure 23:
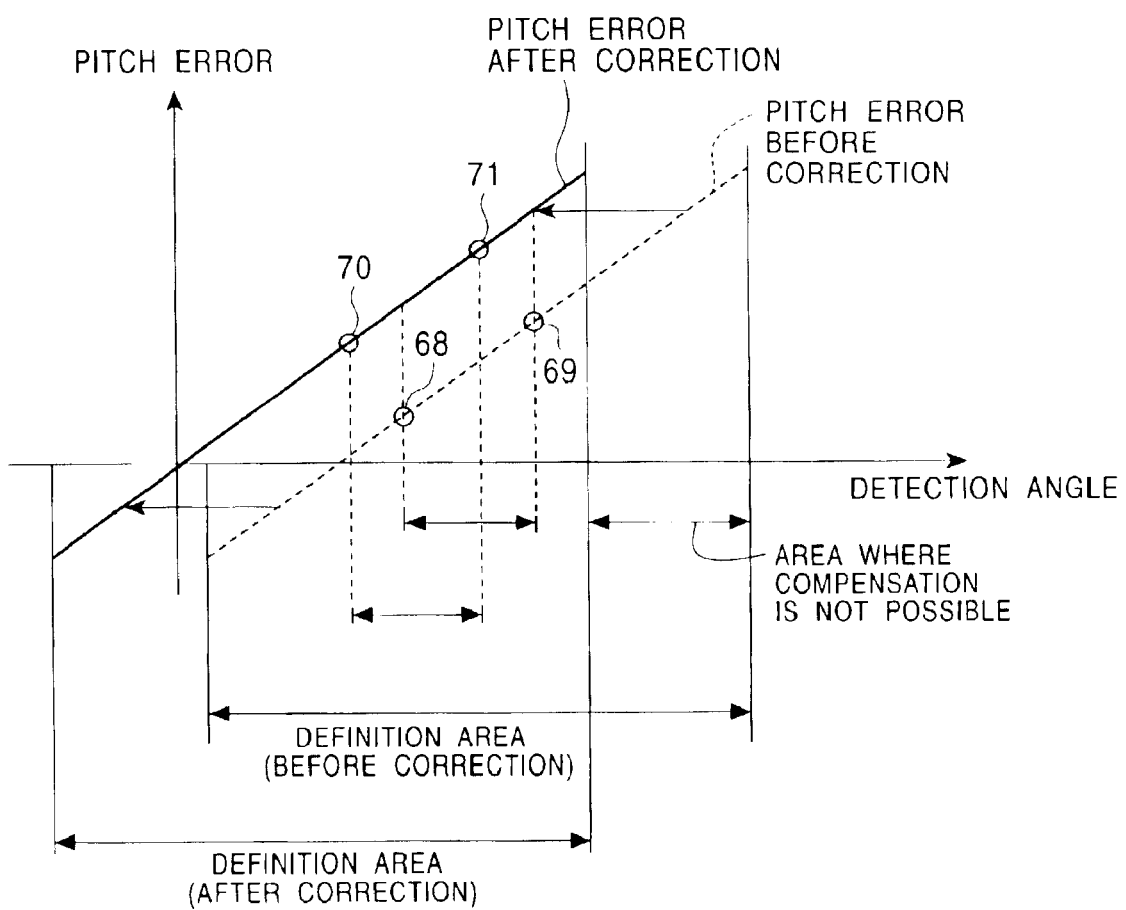
FIG. 23 is a diagram showing another manner in which the pitch error is corrected according to the third embodiment of the present invention.
Figure 24:
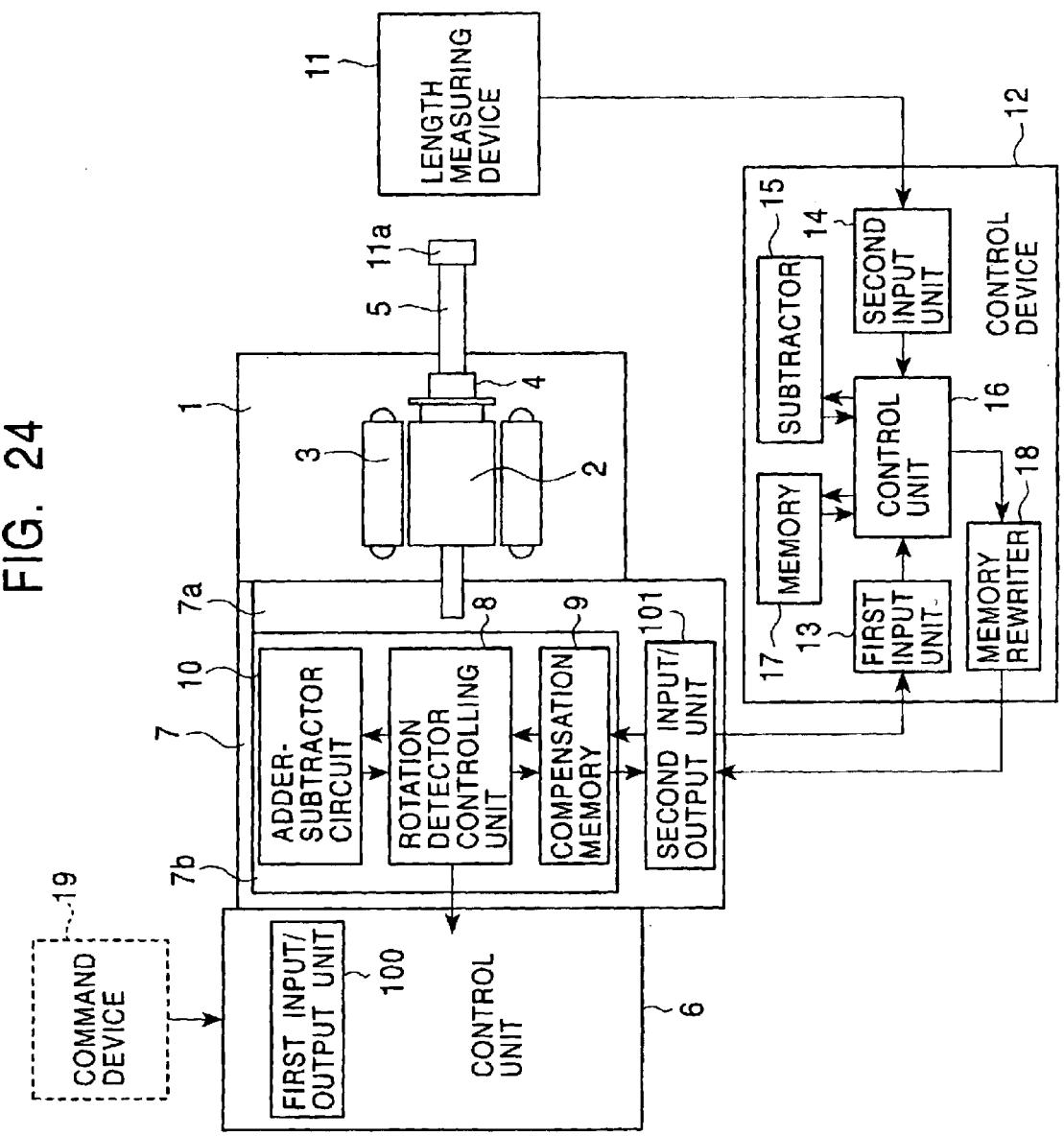
FIG. 24 is a structure diagram showing an example of a conventional art.

FIG. 21 is a flowchart showing the above-described calculations.

With reference to FIG. 21, first, i is set to an initial value (S96), and then $J_{min}$ is also set to an initial value (S97). Then, a, b, and J are calculated by equations (11), (12), and (9), respectively (S98 to S100), and $J_{min}$ is compared with J (S101). When $J_{min}$>J is satisfied, a, b, and J are stored as $a_{min}$, $b_{min}$, and $J_{min}$ (S102), and when $J_{min}$>J is not satisfied, the calculation process jumps to S103. Then, i is increased by 1 (S103), and it is determined whether or not i satisfies equation (13) (S104). When i does not satisfy equation (13), $a_{min}$ and $b_{min}$ which are obtained as described above are stored in the compensation memory 23 as the correction factors a and b, and the calculation process ends (S105). When i satisfies equation (13), the calculation process returns to S98, and S98 to S103 are repeated.

The correction factors a and b, which are obtained by the above-described calculation process, are stored in the compensation memory 23, and are used in the normal operation mode for calculating the pitch error compensation data using the following equation.

When the data stored at an address i is d[i], the pitch error that occurs at the detection angle θ can be obtained from equation (1) as $$d\left[\text{floor}\left(\frac{\theta-a}{N}\right)+\text{Offset}\right]+b.$$

However, after the correction, the pitch error is calculated based on the correction factors a and b as $$d\left[\text{floor}\left(\frac{\theta}{N}\right)+\text{Offset}\right].$$

Third Embodiment

Without using the method described above in the second embodiment, the correction factors may also be simply calculated as:

$$a = \frac{\varepsilon+\varepsilon'}{2}, b = \frac{\{L_0-(x_0+\varepsilon_0+f(x_0+\varepsilon_0-a))\}+\{L_1-(x_1+\varepsilon_1+f(x_1+\varepsilon_1-a))\}}{2} \quad (14)$$

Alternatively, they may also be calculated as:

$$a = 0, b = L \cdot \frac{\varepsilon+\varepsilon'}{2} \quad (15)$$

Equation (14) is used in the case in which the positional relationship between the detector and the output shaft has changed due to disassembling, etc., of the cylinder servo motor. The positional relationship changes at a time when, for example, the rotational/linear motion converting mechanism is disassembled and mounting angles of the rotor, nut and output shaft are changed. This calculation corresponds to FIG. 23, in which the error curve e=f(x) is corrected by moving it in parallel in the horizontal direction. Equation (15) is used in the case in which the length of the ball screw is changed due to abrasion, etc., and the errors at the stroke end positions are used for calculating an offset. This calculation corresponds to FIG. 22, in which the error curve e=f(x) is corrected by moving it in parallel in the vertical direction.

Fourth Embodiment

In the above-described second and third embodiments, the correction factors used for compensating the detection angle in the process of obtaining the pitch error (that is, the compensation data for the pitch error), which is stored in the positioning error table in advance in association with the detection angle, are calculated. Then, the pitch error corresponding to the compensated detection angle, which is calculated based on the correction factors, is obtained from the compensation memory 23 and used for compensating for the pitch error. More specifically, even when errors due to age deterioration, disassembling for repair, etc., have occurred, they can be compensated for without correcting the pitch error data itself, which is stored in the compensation memory 23 in association with the detection angle. However, the above-described errors may also be compensated for without correcting the detection angle detected by the rotation detector 28, by correcting the pitch error data itself using the above-described correction factors.

As described above, according to the present invention, the cylinder servo motor with a built-in control device comprises a servo motor unit having a rotor; a rotational/linear motion converting mechanism which is disposed on a rotating shaft of the servo motor unit and which converts rotational motion of the rotating shaft to linear motion; a current detector which detects a current applied to the servo motor unit; a rotation detector which detects a rotation angle of the servo motor unit; and a control unit which controls the servo motor unit. The servo motor unit and the control unit are mechanically combined, and the control unit includes a command memory which stores commands used in positional error measurement of the servo motor unit; inputting means which inputs a measurement result obtained from a length measuring device, which measures a position of an output shaft of the rotational/linear motion converting mechanism which is operated based on the commands stored in the command memory, and commands from an external command device; operation mode switching means which switches an operation mode of the cylinder servo motor with the built-in control device between a normal operation mode and a test operation mode; positioning error compensation data calculating means which, when the test operation mode is selected by the operation mode switching means, calculates an estimated position of the output shaft of the rotational/linear motion converting mechanism based on the detection angle detected by the rotation detector, and then calculates positioning error compensation data based on the estimated position of the output shaft and the measurement result of the length measuring device which is input through the inputting means; a compensation memory which stores the positioning error compensation data calculated by the positioning error compensation data calculating means; and compensating means which, when the normal operation mode is selected by the operation mode switching means, compensates for a positioning error based on the positioning error compensation data stored in the compensation memory for controlling the servo motor unit. Accordingly, in the process of constructing the positioning error compensation data, it is not necessary to prepare any testing devices other than the length measuring device. Thus, the compensation data can be easily constructed after maintenance, repair, etc., at places other than the factory from which the cylinder servo motor with the built-in control device is shipped. In addition, since special testing devices are not required in the process of constructing the compensation data in the factory from which the cylinder servo motor with the built-in control device is shipped, costs for manufacturing and installing the testing device can be reduced.

Moreover, since a single inputting means is used for inputting both the measurement result obtained from the length measuring device and commands from the external command device, only one pair of input connector and circuit for communication is required. Thus, the number of components and costs can be reduced.

Further, according to the present invention, the control unit may further include backlash compensation data calculating means which, when the normal operation mode is selected by the operation mode switching means, calculates backlash compensation data based on data stored in the compensation memory, the detection data obtained from the rotation detector, and detection data obtained from the current detector; and compensating means which compensates for a backlash error based on the backlash compensation data for controlling the servo motor unit. Accordingly, backlash error can be corrected with high accuracy. In addition, since the control unit of the cylinder servo motor calculates the backlash compensation data, compared with the case in which the amount of backlash is calculated by an external command device, an additional time for communication can be omitted and the amount of backlash can be estimated in real-time.

Further, according to the present invention, the control unit may further include data constructing means which, when the test operation mode is selected by the operation mode switching means, constructs data used for calculating the backlash compensation data and stores the constructed data in the compensation memory. Accordingly, the data used for calculating the backlash compensation data can be easily constructed without using any testing devices other than the length measuring device.

Furthermore, according to the present invention, the cylinder servo motor with a built-in control device may further comprise a temperature detector which detects the temperature of the rotational/linear motion converting mechanism, and the control unit may further include temperature error compensation data calculating means which, when the normal operation mode is selected by the operation mode switching means, calculates temperature error compensation data based on data stored in the compensation memory and detection data obtained from the temperature detector; and compensating means which compensates for a temperature error based on the temperature error compensation data for controlling the servo motor unit. Accordingly, the error due to temperature increase can be compensated for by the cylinder servo motor itself without the assistance of the user or an exterior command device. In addition, since the cylinder servo motor contains the temperature detector, it is not necessary to install a temperature detector into the mechanical apparatus, nor is it necessary to design and fabricate a cable for transmitting data obtained by the temperature detector and a circuit for processing the data. Thus, the manufacturing cost of the mechanical apparatus and the size thereof can be reduced. Further, since the distance between the temperature detector and the control unit can be reduced, the degradation of the signals transmitted from the temperature detector to the control unit via an A/D converter can be prevented, and the compensation can be performed with high accuracy.

In addition, according to the present invention, the control unit may further include data constructing means which, when the test operation mode is selected by the operation mode switching means, constructs data used for calculating the temperature error compensation data and stores the constructed data in the compensation memory. Accordingly, the data used for calculating the temperature compensation data can be easily constructed without using any testing devices other than the length measuring device.

Moreover, according to the present invention, the control unit may further include strain calculating means which, when the normal operation mode is selected by the operation mode switching means, calculates a thrust applied to the output shaft of the rotational/linear motion converting mechanism based on detection data obtained from the current detector, and then calculates strain data of the output shaft of the rotational/linear motion converting mechanism based on the thrust; and compensating means which compensates for a strain based on the strain data for controlling the servo motor unit. Accordingly, strain compensation can be performed with high accuracy. In addition, since the control unit of the cylinder servo motor calculates the strain compensation data, compared with the case in which the strain is calculated by an external command device, an additional time for communication can be omitted and the strain compensation can be performed in real-time.

According to the present invention, the control unit may include a memory which stores a plurality of positioning error compensation data values in association with detection angles detected by the rotation detector; and calculating means which calculates estimated stroke end positions of the output shaft of the rotational/linear motion converting mechanism at a time when the output shaft is moved to stroke ends thereof in a state such that the cylinder servo motor with the built-in control device is installed in a mechanical apparatus, compares the estimated stroke end positions with stroke end positions that are individual to the mechanical apparatus, and, when there are differences between the estimated stroke end positions and the stroke end positions individual to the mechanical apparatus, calculates data for obtaining, from the plurality of positioning error compensation data values, a specific positioning error compensation data value which is able to compensate for a positioning error based on the differences, or data for correcting the plurality of positioning error compensation data values, based on the differences in a process of compensating for the positioning error. Accordingly, the positioning error compensation data can be corrected without taking the cylinder servo motor out from the mechanical device, and without using the length measuring device or other additional devices.

In addition, the present invention can be realized by the software programs installed in the control unit, without using any additional mechanisms and components except for the temperature detector. Thus, the cylinder servo motor of the present invention can be obtained without increasing costs.

INDUSTRIAL APPLICABILITY

As described above, the cylinder servo motor with the built-in control device according to the present invention is suitable for use as a substitute for a hydraulic cylinder or an air cylinder in a mechanical apparatus using a hydraulic cylinder or an air cylinder.

What is claimed is:

1. A cylinder servo motor with a built-in control device, comprising:

a servo motor unit having a rotor;

a rotational/linear motion converting mechanism which is disposed on a rotating shaft of the servo motor unit and which converts rotational motion of the rotating shaft to linear motion;

a current detector for detecting a current flowing in said servo motor unit;

a rotation detector for detecting a rotation angle of said servo motor unit; and a control unit for controlling the servo motor unit;

wherein the servo motor unit and the control unit are mechanically combined, and wherein said control unit includes:

a command memory for storing commands used in positional error measurement of said servo motor unit;

input means for inputting a measurement result obtained from a length measuring device, which measures a position of an output shaft of said rotational/linear motion converting mechanism which is operated based on the commands stored in said command memory, the input means further inputting commands from an external command device;

operation mode switching means for switching an operation mode of said cylinder servo motor with the built-in control device between a normal operation mode and a test operation mode;

positioning error compensation data calculating means for calculating an estimated position of the output shaft of said rotational/linear motion converting mechanism based on the detection angle detected by said rotation detector, when the test operation mode is selected by the operation mode switching means, and for then calculating positioning error compensation data based on the estimated position of said output shaft and the measurement result of the length measuring device which is input through the inputting means;

a compensation memory for storing the positioning error compensation data calculated by the positioning error compensation data calculating means; and compensating means for compensating for a positioning error based on the positioning error compensation data stored in the compensation memory for controlling the servo motor unit when the normal operation mode is selected by the operation mode switching means.

2. A cylinder servo motor with a built-in control device according to claim 1, wherein the control unit further comprising:

backlash compensation data calculating means for calculating backlash compensation data based on data stored in the compensation memory, the detection data obtained from the rotation detector, and detection data obtained from the current detector, when the normal operation mode is selected by the operation mode switching means; and compensating means which compensates for a backlash error based on the backlash compensation data for controlling the servo motor unit.

3. A cylinder servo motor with a built-in control device according to claim 2, wherein the control unit further comprises means for constructing data used for calculating the backlash compensation data and storing said constructed data in said compensation memory when the test operation mode is selected by the operation mode switching means.

4. A cylinder servo motor with a built-in control device according to claim 1, further including a temperature detector for detecting the temperature of said rotational/linear motion converting mechanism, wherein the control unit further comprises:

temperature error compensation data calculating means for calculating temperature error compensation data based on data stored in the compensation memory and detection data obtained from the temperature detector when the normal operation mode is selected by the operation mode switching means; and compensating means for compensating for a temperature error based on the temperature error compensation data for controlling the servo motor unit.

5. A cylinder servo motor with a built-in control device according to claim 4, wherein the control unit further comprising:

data constructing means for constructing data used for calculating the temperature error compensation data and storing the constructed data in the compensation memory when the test operation mode is selected by the operation mode switching means.

6. A cylinder servo motor with a built-in control device according to claim 1, wherein the control unit further comprises:

strain calculating means for calculating a thrust applied to the output shaft of the rotational/linear motion converting mechanism based on detection data obtained from the current detector, and then calculating strain data of the output shaft of the rotational/linear motion converting mechanism based on the thrust, and compensating means for compensating for a strain based on the strain data for controlling the servo motor unit when the normal operation mode is selected by the operation mode switching means.

7. A cylinder servo motor with a built-in control device, comprising:

a servo motor unit having a rotor;

a rotational/linear motion converting mechanism which is disposed on a rotating shaft of the servo motor unit and which converts rotational motion of the rotating shaft to linear motion;

a rotation detector for detecting a rotation angle of said servo motor unit; and a control unit for controlling said servo motor unit, wherein the servo motor unit and the control unit are mechanically combined, and wherein the control unit includes:

a memory for storing a plurality of positioning error compensation data values in association with detection angles detected by the rotation detector; and calculating means for calculating estimated stroke end positions of the output shaft of the rotational/linear motion converting mechanism at a time when the output shaft is moved to stroke ends thereof in a state such that the cylinder servo motor with the built-in control device is installed in a mechanical apparatus, comparing the estimated stroke end positions with stroke end positions that are individual to the mechanical apparatus, and calculating data for obtaining from said plurality of positioning error compensation data values stored in said memory a specific positioning error compensation data value which is able to compensate for a positioning error, or data for correcting said plurality of positioning error compensation data values, on the basis of the differences between said estimated stroke end positions and said individual stroke end positions, in a process of compensating for the positioning error.

* * * * *